US012538284B2

(12) United States Patent
Esswie

(10) Patent No.: US 12,538,284 B2
(45) Date of Patent: Jan. 27, 2026

(54) BANDWIDTH PART ADAPTATION

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 18/183,593

(22) Filed: Mar. 14, 2023

(65) Prior Publication Data

US 2024/0314760 A1    Sep. 19, 2024

(51) Int. Cl.
| | |
|---|---|
| *H04W 72/0457* | (2023.01) |
| *H04L 5/00* | (2006.01) |
| *H04W 36/06* | (2009.01) |
| *H04W 52/02* | (2009.01) |

(52) U.S. Cl.
CPC ......... *H04W 72/0457* (2023.01); *H04L 5/001* (2013.01); *H04L 5/0062* (2013.01);
(Continued)

(58) Field of Classification Search
None
See application file for complete search history.

(56) References Cited

U.S. PATENT DOCUMENTS

| | | | | |
|---|---|---|---|---|
| 2019/0132824 A1* | 5/2019 | Jeon | ...................... | H04L 5/0098 |
| 2021/0136726 A1* | 5/2021 | Niu | ...................... | H04W 48/08 |

(Continued)

FOREIGN PATENT DOCUMENTS

| | | |
|---|---|---|
| EP | 3 758 411 | 12/2020 |
| KR | 2023 0024575 | 2/2023 |

(Continued)

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Jay L Vogel
(74) *Attorney, Agent, or Firm* — Amin, Turocy & Watson, LLP

(57) ABSTRACT

A radio access network node transmits a bandwidth part configuration comprising one or more bandwidth part resource arrangements corresponding to one or more bandwidth parts. Responsive to determining that a bandwidth part change criterion is satisfied with respect to a particular bandwidth part, the node may indicate to only user equipment using the particular bandwidth part, via a resource arrangement change indication corresponding to a resource arrangement of the bandwidth part configuration, that the node has determined to change operation of the particular bandwidth part according to the resource arrangement indicated by the resource arrangement change indication. Other bandwidth parts used by user equipment with respect to the RAN may be unchanged by a bandwidth part resource arrangement change. A resource arrangement change indication may indicate deactivating of a resource and offloading functionality facilitated by the deactivated resource to an active resource of another bandwidth part.

20 Claims, 12 Drawing Sheets

(52) U.S. Cl.
CPC ........... *H04L 5/0098* (2013.01); *H04W 36/06* (2013.01); *H04W 52/0261* (2013.01)

(56) References Cited

U.S. PATENT DOCUMENTS

| | | | | |
|---|---|---|---|---|
| 2022/0110057 | A1* | 4/2022 | Wang | H04W 52/0235 |
| 2022/0132509 | A1* | 4/2022 | Huss | H04L 5/001 |
| 2024/0048348 | A1* | 2/2024 | Abdelghaffar | H04L 5/0023 |
| 2024/0137938 | A1* | 4/2024 | Zhou | H04L 5/0053 |
| 2024/0292277 | A1* | 8/2024 | Dreiling | H04W 24/08 |

FOREIGN PATENT DOCUMENTS

| | | | | |
|---|---|---|---|---|
| WO | WO-2021208819 | A1 * | 10/2021 | ............ H04W 72/23 |
| WO | 2022/031824 | | 2/2022 | |
| WO | 2022/199703 | | 9/2022 | |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.

Technical specifications (TS) 38.211—"5G; NR; Physical channels and modulation", 3GPP TS 38.211 version 16.2.0 Release 16, Jul. 2020, 136 pages.

Technical specifications (TS) 38.304—"5G; NR; User Equipment (UE) procedures in idle mode and in RRC Inactive state", 3GPP TS 38.304 version 16.1.0 Release 16, Jul. 2020, 41 pages.

Technical specifications (TS) 38.300—"5G; NR; NR and NG-RAN Overall description; Stage-2" 3GPP TS 38.300 version 16.4.0 Release 16, Jan. 2021, 151 pages.

Invitation to Pay Additional Fees mailed Mar. 6, 2024 for PCT Application No. PCT/US2023/035971, 18 pages.

Sukchel Yang et al: "Discussion on physical layer techniques for network energy savings", 3GPP Draft; RI-2212302; 3GPP Ran 1, No. Toulouse, FR; Nov. 7, 2022, [https://www.3gpp.org/ftp/TSG_RAN/WG1_R LI/TSGRI_III/Docs/RI-2212302.zip RI-2212302.docx ] 23 pages.

International Search Report and Written Opinion mailed Apr. 26, 2024 for PCT Application No. PCT/US2023/035971, 28 pages.

Notification Concerning Transmittal of International Preliminary Report on Patentability mailed Sep. 25, 2025 for PCT Application No. PCT/US2023/035971, 19 pages.

European Office Action mailed Oct. 21, 2025 for European Patent Application No. 23810208.1, 3 pages.

* cited by examiner

BANDWIDTH PART ADAPTATION

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise transmitting, by a radio access network node comprising a processor to a first user equipment, a first bandwidth part configuration comprising a first resource arrangement, for example, an arrangement of time or frequency resources, corresponding to a first bandwidth part of a frequency range associated with the radio access network node and a second resource arrangement corresponding to the first bandwidth part of the frequency range allocated to the radio access network node. The example method embodiment may comprise determining, by the radio access network node, a usage of the first bandwidth part being operated according to the first resource arrangement to result in a determined usage and analyzing the determined usage with respect to a bandwidth part change criterion to result in an analyzed determined usage. The analyzed determined usage may comprise a determination that the first bandwidth part is being used by fewer than a configured number of user equipment device. Based on the analyzed determined usage of the first bandwidth part satisfying the bandwidth part change criterion, the example method embodiment may comprise determining, by the radio access network node, to operate the first bandwidth part according to the second resource arrangement. In the example embodiment, the method may comprise transmitting, by the radio access network node to the first user equipment, a bandwidth part change indication indicative of the radio access network node having determined to operate the first bandwidth part according to the second resource arrangement. The radio access network node may begin operation of the first bandwidth part according to the second resource arrangement. The bandwidth part change indication may be transmitted via a downlink control information signal.

In an embodiment, operation by the radio access network node of the first bandwidth part according to the first resource arrangement uses a first subrange resource set within the frequency range associated with the radio access network node, and wherein operation of the first bandwidth part by the radio access network node according the second resource arrangement uses a second subrange resource set within the frequency range associated with the radio access network node. For example, the frequency range associated with the radio access network node may be 100 MHz and the first subrange resource set may comprise a particular 10 MHz spectrum range within the 100 MHz frequency range associated with the radio access network. In an embodiment, the 100 MHz frequency range associated with the radio access network may be a frequency range allocated for use by a particular mobile network operator, or wireless communication services carrier.

In an embodiment, the second resource arrangement may comprise a deactivated resource set within the second subrange resource set. In an embodiment, the first subrange resource set and the second subrange resource set are the same (e.g., changing operation of the first bandwidth part from operation according to the first resource arrangement to operation according to the second resource arrangement does not change a spectrum range of the first bandwidth part. In an embodiment, the second resource arrangement excludes resources from being allocated to reference signal signaling.

In another embodiment, the second resource arrangement may exclude resources from being allocated to control channel traffic (e.g., the second resource arrangement does not configure resources of the first bandwidth part to be used for control channel traffic). In an embodiment, the first bandwidth part configuration may comprise a third resource arrangement, corresponding to a second bandwidth part of the frequency range associated with the radio access network node, and the bandwidth part change indication may be indicative of the radio access network node having determined to transmit control channel traffic according to the third resource arrangement (e.g., the radio access network node may determine to 'offload' control channel traffic, that may otherwise have been facilitated by the first bandwidth part, to the second bandwidth part.)

The example method embodiment may further comprise transmitting, by the radio access network node to a second user equipment, a second bandwidth part configuration comprising a third resource arrangement corresponding to a second bandwidth part of the frequency range associated with the radio access network node. The example embodiment method may further comprise excluding, by the radio access network node, transmitting of the bandwidth part change indication to the second user equipment. For example, the radio access network node may transmit a different bandwidth part configuration to the first user equipment than the node transmits to the second user equipment. Accordingly, the bandwidth part change indication may not be transmitted to the second user equipment, due to the second bandwidth part not being changed by the radio access network node, thus making a change to resource arrangement of the first bandwidth part 'invisible' to the second user equipment.

In an embodiment of the example method, the first resource arrangement and the second resource arrangement may be used to communicate with the first user equipment instead of a baseline resource arrangement corresponding to the first bandwidth part, and the first bandwidth part may be allocated the same resources of the frequency range associated with the radio access network node for communication with the first user equipment according to the baseline resource arrangement, the first resource arrangement, or the second resource arrangement. (E.g., a bandwidth part resource arrangement for the first bandwidth part may change, including some resources being deactivated, without changing a bandwidth allocated to the first bandwidth part.)

In another example embodiment of the method, the first user equipment may be one of a set of user equipment having an established connection with the radio access network node using the first bandwidth part, wherein determining the determined usage may comprise determining a number of the set of user equipment having an established connection with the radio access network node using the first bandwidth part to result in a determined number of connected mode user equipment. The bandwidth part change criterion may comprise a connected mode user equipment threshold. The bandwidth part change criterion may be satisfied by the determined number of connected mode user equipment being less than the connected mode user equipment threshold. For example, if the radio access network node determines that the first bandwidth part is lightly loaded because the determined number of connected mode user equipment is less than the connected mode user equipment threshold, the radio access network node may determine to change the resource arrangement of the bandwidth part to reduce energy consumption at the node.

In another embodiment of the example method, the first user equipment may be one of a set of user equipment having an established connection with the radio access network node, wherein determining the determined usage may comprise determining a number of the set of user equipment having an established connection with the radio access network node using the first bandwidth part to obtain a quality-of-service to result in a determined number of quality-of-service user equipment. The bandwidth part change criterion may comprise a connected mode user equipment quality-of-service threshold, and the bandwidth part change criterion may be satisfied by the determined number of quality-of-service user equipment being higher than the connected mode user equipment quality-of-service threshold. For example, if a determined number of quality-of-service user equipment exceeds the connected mode user equipment quality-of-service threshold such that the quality-of-service being obtained by the determined number of quality-of-service user equipment cannot be supported by a first, or current, resource arrangement of the first bandwidth part that comprises deactivated resources for data transmission, the radio access network node may determine a second resource arrangement that does not comprise deactivated data resources. On the other hand, if a determined number of quality-of-service user equipment does not exceed the connected mode user equipment quality-of-service threshold such that the quality-of-service being obtained by the determined number of quality-of-service user equipment can be supported by a first, or current, resource arrangement of the first bandwidth part that comprises deactivated resources for data transmission, the radio access network node may determine not to change bandwidth part arrangement. Alternatively, in an embodiment, if a determined number of quality-of-service user equipment does not exceed the connected mode user equipment quality-of-service threshold such that the quality-of-service being obtained by the determined number of quality-of-service user equipment can be supported by a resource arrangement that comprises deactivated resources for data transmission, and the current bandwidth part arrangement does not comprise deactivated resources, the radio access network node may determine to change bandwidth part resource arrangement from the first resource arrangement to a second resource arrangement that comprises deactivated resources.

In another example embodiment a radio access network node comprises a processor configured to communicate with a first user equipment according to a first bandwidth part and communicate with a second user equipment according to a second bandwidth part. The processor may be configured to determine a power supply characteristic corresponding to a power source corresponding to the radio access network node to result in a determined power supply characteristic. The processor may be configured to analyze the determined power supply characteristic with respect to a power supply characteristic criterion to result in an analyzed power supply characteristic, and, based on the analyzed power supply characteristic satisfying the power supply characteristic criterion, transmit to the first user equipment a bandwidth part change indication. The bandwidth part change indication may be indicative of the radio access network node having determined to change communication with the first user equipment from operation according to a first resource arrangement corresponding to a first bandwidth part to operation according to a second resource arrangement corresponding to the first bandwidth part. The processor may be further configured to exclude transmitting of the bandwidth part change indication to the second user equipment. The processor may be further configured to change operation of the radio access network node with respect to the first user equipment to communicate with the first user equipment according to the second resource arrangement corresponding to the first bandwidth part.

In an embodiment, the power source may comprise a battery. The power supply characteristic may be a charge level of the battery, the power supply characteristic criterion may comprise a battery charge threshold, and the analyzed power supply characteristic may satisfy the power supply characteristic criterion by the charge level of the battery being below the battery charge threshold.

In an embodiment, the bandwidth part change indication may comprise an active period indication indicative of a period during which the processor is to cause the radio access network node to communicate with the first user equipment according to the second resource arrangement corresponding to the first bandwidth part.

In an embodiment, the second resource arrangement corresponding to the first bandwidth part may comprise a deactivated resource set, and an allocation of resources to the first bandwidth part may be the same during operation of the radio access network node according to the first resource arrangement or the second resource arrangement. In other words, in the embodiment, the first bandwidth part may be allocated the same bandwidth regardless of whether resources are arranged according to the first resource arrangement or the second resource arrangement.

In another embodiment, a non-transitory machine-readable medium, comprises executable instructions that, when executed by a processor of a radio access network node, facilitate performance of operations. The operations may comprise transmitting, to user equipment, a first bandwidth part configuration comprising a first resource arrangement corresponding to a first bandwidth part of a frequency range allocated to the radio access network node, a second resource arrangement corresponding to the first bandwidth part of the frequency range allocated to the radio access network node, and a third resource arrangement corresponding to a second bandwidth part of the frequency range allocated to the radio access network node. The operations may further comprise determining a determined usage of the first bandwidth part by a first set of the user equipment and analyzing the determined usage with respect to a bandwidth part change criterion to result in an analyzed determined usage. Based on the analyzed determined usage of the first bandwidth part satisfying the bandwidth part change criterion, the operations may further comprise determining to operate the first bandwidth part according to the second resource arrangement. The operations may further comprise transmitting, to the first set of the user equipment according to a scrambling code corresponding to the first set of the user equipment, a bandwidth part change indication indicative of the radio access network node having determined to operate the first bandwidth part according to the second resource arrangement.

In an embodiment, a subrange resource set within the frequency range allocated to the radio access network node may be allocated for operation by the radio access network node of the first bandwidth part according to the first resource arrangement. The subrange resource set within the frequency range allocated to the radio access network node may be allocated for operation by the radio access network node of the first bandwidth part according to the second resource arrangement, and the second resource arrangement may comprise a deactivated resource set within the subrange resource set.

In an embodiment, the determined usage may comprise a determined number of the first set of the user equipment having an established connection with the radio access network node using the first bandwidth part to result in a determined number of connected mode user equipment, wherein the bandwidth part change criterion comprises a connected mode user equipment threshold, and wherein the bandwidth part change criterion is satisfied by the determined number of connected mode user equipment being less than the connected mode user equipment threshold.

In an embodiment, the third resource arrangement may be used by a second set of the user equipment different than the first set of the user equipment, and the transmitting of the bandwidth part change indication may exclude transmitting of the bandwidth part change indication to the second set of the user equipment.

DETAILED DESCRIPTION OF THE DRAWINGS

Figure 1:
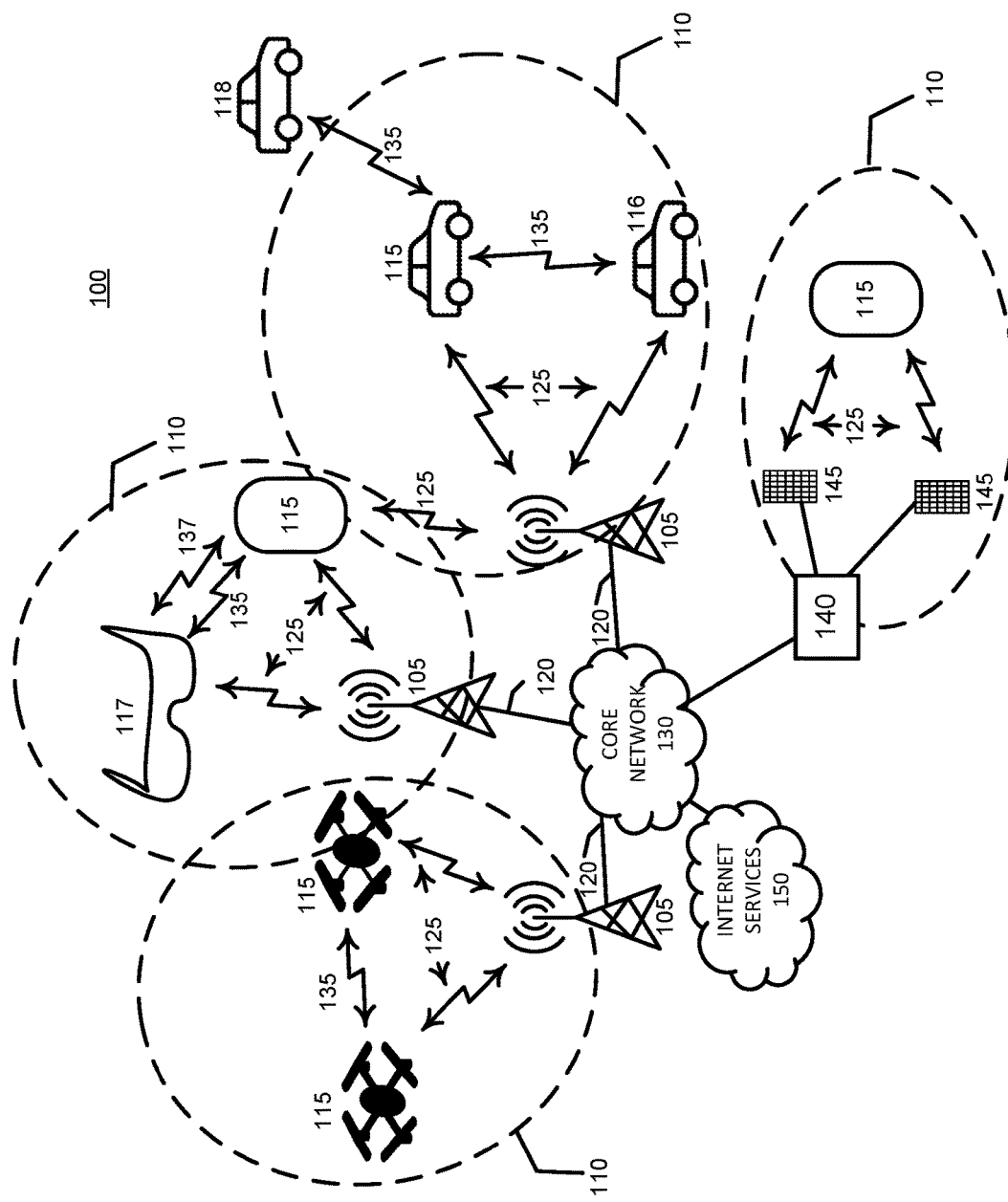
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network Energy Saving.

Energy or power saving is desirable in cellular networks, for both network equipment and user equipment. An objective of Network Energy Saving ("NES") mode is to facilitate a RAN node, that may be experiencing high power consumption, limited battery capacity, or power source disruptions, dynamically relaxing support of one or more radio functions, or one or more radio services, that the RAN node may otherwise support, until an improvement in power situation is achieved, for example, an off-site power source of the RAN node being restored such that the RAN no longer relies on power from a battery on-site at the RAN, or until capacity of an on-site battery is restored to a configured level. Implementing NES may facilitate cost efficiency or power efficiency at the RAN node, (e.g., activating NES mode during a light load time for a RAN that experiences a high variance rate of traffic loads throughout a given day), or may facilitate service continuity, especially for emergency services/calls, in case of power source disruptions/outage.

Accordingly, a cell's RAN node may dynamically implement NES mode to temporarily halt support of, or offering of, high-energy-consumption radio services or services for a determined or configured period. Non-limiting examples of power-heavy radio services, or operations, include ultra-fast scheduling associated with mini-slot scheduling for latency-critical services, data duplication for enhanced radio reliability, and others. For already-connected user equipment (e.g., a user equipment that is RRC CONNECTED with a RAN), the RAN may already be aware of services, traffic types, and quality of service (QOS) targets, corresponding to traffic flows associated with the already-connected user equipment. Thus, the RAN node can determine to avoid NES mode activation to avoid negatively impacting critical traffic currently being served to the user equipment by the RAN. However, the RAN node may not be aware of user equipment in an IDLE mode that are not actively connected to the RAN node even if the idle mode user equipment are within a coverage area, or range, of the RAN and the RAN node may not be aware of target QoS targets or services that may be needed, or requested, by an idle user equipment when user equipment later initiates connection to the RAN node. Thus, according to current implementations, an idle mode user equipment device, which may be camped on a NES-mode-activated RAN node, may only be aware of the NES mode activation by the RAN and the services which are currently not offered or not supported by the RAN node, when the user equipment initiates connection establishment procedures with the RAN node. Such initiation of connection procedures may comprise user equipment devices executing random access procedures and corresponding subsequent power-heavy and signaling-heavy connection establishment procedures. Only after initiating and connecting to the RAN node may the user equipment become aware that the RAN node has activated NES mode and is not currently offering or supporting a service or radio function that the user equipment may need to request, which may result in the user equipment discarding the established connection with the RAN and attempting reselection of another neighboring RAN node. Such connecting of the user equipment to the RAN node may lead to energy inefficiency at both the RAN node and at the user equipment as well as wasted signaling overhead and a delayed network access of impacted idle devices.

Currently, several schemes for implementing network power savings may be implemented. An example of a currently implemented NES mode procedure is Aggregated Paging Occasions ("APO"), wherein user equipment devices are aggregated to monitor and blindly decode the same paging occasion. This reduces the total number of paging occasions a RAN node has to transmit but comes at the expense of idle mode devices waking up and decoding the same paging occasion that may include paging information for only a single user equipment device, (e.g., a paging 'false alarm'). With APO, benefits of NES may be overshadowed by increased energy consumption at aggregated user equipment devices due to paging false alarms.

Another example of a currently implemented NES mode procedure is for a cell/RAN node to shut down and not accept new connection requests from user equipment that are not currently connected to the cell/RAN. Shutting down the accepting of new connection requests, or even stopping current device connections for all or part of one or more active services, is a straightforward NES solution, but one that may cause a negative impact on a user equipment's achievable quality of service. Furthermore, shutting down accepting of new connection request may lead to coverage gaps, where an idle user equipment may be unaware of, or 'blind' to, the halting of services resulting in the user equipment attempt to connect to the RAN (and thus expending battery power and time resources of the user equipment) notwithstanding that the RAN is not currently offering a service that the user equipment needs to the RAN. In case of a need for an emergency service, such as fire, rescue, law enforcement, etc., a user equipment being blind to radio services that have been deactivated by a RAN may impose a safety risk to a user of the blind user equipment.

Idle mode operations comprise several procedures for user equipment devices in idle mode to perform, for example: determining coverage level/signal strength corresponding to surrounding cells; camping on, or selecting, a certain cell/RAN; or monitoring a detected coverage level/signal strength of the cell/RAN in case the user equipment moves or in case radio conditions change. Idle mode devices may be viewed as active user equipment that are not connected to a cell/RAN; thus the RAN network is not aware of locations of idle mode devices and a density of idle user equipment.

When a user equipment device is turned on, the user equipment device searches for and attempts decoding synchronization signal blocks ("SSB") signals transmitted by surrounding RAN nodes/cells-SSB signals are typically the sole always-transmitted signals of a 5G RAN node. An SSB enables idle mode devices to, for example: obtain downlink radio frequency ("RF") receiver synchronization with the surrounding cells/RANs; determine cell identifiers of the surrounding cells/RANs; and determine coverage levels using SSB downlink reference signal (e.g., the user equipment may determine signal strength based on reference signal received power ("RSRP") corresponding to each of the detected cells/RANs).

Accordingly, an idle mode device, based on detected SSBs, and determined coverage levels of surrounding cells/RANs corresponding to the determined cell/RAN identifiers, may select a stand-by cell/RAN to camp on that offers the best coverage level/determined signal strength. The user equipment initiates a connection to the stand-by cell/RAN (e.g., initiates an RRC connection) when the user equipment needs to connect to the network, (e.g., for receiving a call or for initiating an uplink data session without using time to perform cell selection, since the cell/RAN selection has already been performed). Thus, cell/RAN selection/reselection procedures are typically periodically executed regardless of whether the idle mode device needs to connect to the cell/RAN.

An idle mode device may initiate cell reselection using the same procedure as cell selection but searching for another cell than the one previously selected/currently selected at an instant according to an idle mode period configured at the user equipment or periodically according to a configuration received from the cell/RAN. Cell/RAN reselection benefits a user equipment because a given selected cell/RAN that was optimum with respect to the user equipment at one time may not provide a determined strongest signal strength at a later time, which scenario may occur if the idle mode user equipment is moving between cells or if channel radio conditions change. Thus, when an idle mode user equipment detects coverage degradation corresponding to a currently selected cell (e.g., based on a defined set of conditions being satisfied), an idle mode device may initiate idle-mode reselection. A cell/RAN node is typically not aware of a reselection determination made by an idle mode device.

For a given selected cell, an idle mode device monitors SSB information transmitted from the cell/RAN and monitors the determined paging occasion(s) corresponding to the cell/RAN. Monitoring SSB information facilitates an idle mode device staying up-to-date regarding coverage levels of the selected cell/RAN and triggering cell-reselection if needed to support an incoming call or data traffic transmission.

Thus, although cells/RANs transmitting SSB signaling facilitates user equipment transition from a low-power IDLE mode to a higher power CONNECTED mode, transmission of SSB blocks is an energy-heavy operation at a cell/RAN. When an idle mode user equipment connects to a RAN node (e.g., transitions from idle to connected mode), the user equipment 'assumes' that services, or QoS profiles that it is pursuing, or requesting, are offered by the currently selected cell. If an idle mode user equipment transitions to a connected mode and then determines that a service that the user equipment needs is inactive at the RAN it is connected to, the UE has expended battery power and time resources in establishing the fruitless connection.

Bandwidth Split into Parts.

A radio access network, comprising, for example, a 5G NR network node, may be implement Bandwidth Part ("BWP") technology. BWP technology may be implemented by dividing a range of frequencies, or bandwidth, that has been assigned to, or allocated to, a carrier, a gNode B, or a carrier's signaling from and to a gNodeB, into multiple smaller bandwidth subsets, or frequency subranges, such that a subset, or subrange, may be 'seen' as a whole communication bandwidth that can be used by a user equipment for communication with a gNodeB/RAN node. From a user equipment perspective, a single configured BWP may be considered the whole available RAN/cell bandwidth, which includes frequency and time resources for data, control, and reference signals. For example, an available bandwidth of 100 MHz may be divided into ten smaller subsets, or subranges, of 10 MHz, with each 10 MHz subrange being referred to as a bandwidth part. A RAN node can configure multiple BWPs for use by different active user equipment devices, or different groups of user equipment devices, with each BWP being used to support radio characteristics corresponding to the BWP, the characteristics including bandwidth level, subcarrier spacing or supported antenna modes. As currently implemented, RAN node may typically configure up to four different BWPs, each having resources facilitating communication in the downlink and uplink directions. However, only a single BWP can be active at a time. This limitation is imposed due to limited processing capabilities of both the network and user equipment devices simultaneously monitoring and receiving multiple BWPs of different radio characteristics.

BWP technology may facilitate performance benefits, such as, for example power saving gain by a user equipment that may be realized by the user equipment scanning, monitoring, or decoding the smaller bandwidth range of the BWP instead of scanning, monitoring, and decoding the larger whole cell bandwidth that may be allocated to a mobile network operator ("MNO")/carrier with which the user equipment has been provisioned for operation. In other words, a user equipment may be configured to tune its radio functions to communicate with a RAN node using frequency and time resources of a BWP, thus the user equipment may not expend processing resources or power resources in scanning the entire range of frequencies allocated to the MNO/carrier. User equipment devices are typically configured to always scan a configured available frequency range/bandwidth for multiple reasons including maintaining synchronization with the RAN node radio interface and to periodically check the user equipment device is camped on the best possible cell/RAN node, or beam thereof, with respect to signal strength coverage. The spectrum of frequencies that may be used for 5G NR communication is significantly greater than a spectrum allocated for, and used by, older mobile communication generations (e.g., LTE, 4G, 3G, etc.), and a frequency range, or spectrum, allocated to a given MNO/carrier for 5G NR operation can span hundreds of MHz. Having to scan an entire 5G NR MNO range by a user equipment would impose a severe processing load on a user equipment device. Thus, having a smaller-sized BWP configured for user equipment facilitates a user equipment device having reduced processing load by only scanning the bandwidth of the configured BWP instead of the entire bandwidth allocated to the MNO/carrier for which the user equipment is configured. Regarding grouping, user equipment devices can be grouped and configured, for example, with the same BWP based on having common quality of service requirements. Accordingly, a BWP configured for a group can be configured with radio aspects and radio resources that are suitable for performance requirements common to devices of the group. For example, a BWP, serving latency-critical devices, is likely to be configured with a larger subcarrier spacing to allow for faster transmissions.

Another benefit of implementing BWP technology is that user equipment devices may be grouped into sets of user equipment devices that share configured BWP resources based on quality-of-service requirements or functionalities that are common among the user equipment devices that are members of the set, or group, of user equipment.

A RAN node may configure multiple BWPs with corresponding different radio resource setups, or arrangements. However, a RAN node may have only one BWP active at a time due to the processing limitations at the RAN node. Accordingly, existing BWP configuration and switching procedures may facilitate power saving and performance gain (e.g., in terms of capacity or latency) by a user equipment. However, since BWP, as currently implemented, is not designed for network power saving, gain in performance or power saving at user equipment may come at the expense of increased network power consumption, BWP switching signaling, or BWP assistance information (e.g., to manage switching between BWPs and to transmit signals indicating such BWP switching/changing to user equipment). For example, according to current implementations of BWP techniques, a RAN can switch from a BWP operated according to a certain radio setup (e.g., certain subcarrier spacing, transmission antenna configuration, etc.) to another BWP with different radio characteristics. According to current BWP techniques, a RAN node cannot dynamically or temporarily de-activate part of a BWP resource arrangement, 'on-the-fly', to achieve a network energy saving gain during a period of light to medium BWP loading (e.g., few, if any, user equipment communicating with the RAN node using the BWP resource arrangement).

Although current BWP techniques may facilitate optimizing power/battery consumption by user equipment devices by avoiding periodically scanning and searching an entire large 5G bandwidth allocated to a given MNO/carrier, or RAN, current BWP techniques are power-inefficient from a RAN's perspective because of multiple and diverse BWP configurations and dynamic BWP switching. For example, with multiple available BWPs, the RAN node simultaneously transmits and receives signals with different radio configurations to serve various user equipment devices via multiple BWPs with each spanning an entire spectrum bandwidth available to the user equipment according to a configured BWP. Accordingly, embodiments disclosed herein facilitate BWP adaptation schemes to minimize power consumption by the RAN node in implementing BWP usage. Specifically, existing BWP techniques do not comprise de-activating or blocking part of available bandwidth of a BWP for RAN node energy saving for situations, such as, for example, light user equipment loading of a given BWP where use (e.g., processing and transmission of signals) over a full BWP bandwidth range may be unnecessary. Currently, a RAN node may dynamically change the bandwidth range of a lightly loaded BWP by statically redefining an entire set of available BWPs, updating bandwidth levels, or ranges, of the modified BWPs, and configuring all active cell-wide user equipment devices with the new BWP set. However, in making such a change to a given BWP, a RAN node modifies other BWP frequency ranges by appending the blocked or de-activated bandwidth to the other available BWPs, and then updates all user equipment that are connected to the RAN node, regardless of which BWP a given user equipment is configured to use, with the new/revised set of active BWP resource arrangements. These multiple signal exchanges (which impact all devices within range of a RAN/cell, even if configured to use a different BWP than the lightly loaded BWP), result in power consumption by the RAN node.

In addition, current BWP techniques require that user equipment devices transmit and receive all various radio channels (control, reference signal, data) within a single configured BWP. Communicating unused channel information may result in fruitless power consumption since in lightly loaded BWPs a RAN node still must transmit a full set of reference signals and control channels accordingly, which may be unnecessary for lightly loaded, or no-load, bandwidth parts (e.g., no user equipment configured for current use of the lightly loaded, or no-load BWP).

Dynamic Bandwidth Part (BWP) Adaptation and Channel Offloading.

Embodiments disclosed herein facilitate BWP adaptation and dynamic channel/signal offloading to achieve dynamic network power saving. Using embodiments disclosed herein, a RAN node may configure multiple BWP resource patterns, or resource arrangements, for the same BWP. A BWP resource pattern, or resource arrangement, may comprise a predefined resource structure, or arrangement, of resources that may be temporarily de-activated, and a RAN node may dynamically updated allocation of data, control, or reference signal resources within the BWP. For example, when a BWP is very lightly loaded, the RAN node can dynamically de-activate a portion of the BWP that is currently allocated according to a currently implemented BWP resource arrangement to data channel information, and configure user equipment devices to switch monitoring and detection of control channel information from a current BWP to another BWP that may be medium to highly loaded, which other BWP needs to facilitate control channel monitoring for purposes of maintaining a configured performance level by user equipment that are already using the other BWP for communication with the RAN node.

Accordingly, embodiments disclosed herein may facilitate network energy saving gain by shutting down some un-needed, lightly-used, or under-utilized BWP resources or operations in one BWP without redefining a BWP more heavily used by other user equipment and without having to signal an indication of such a change (now a non-change) in BWP arrangement of the more heavily used BWP to user equipment that are currently using the more heavily used, or heavily loaded, BWP. In an embodiment, a baseline, or default, BWP may be configured in user equipment with a fixed baseline resource arrangement. A RAN node, based on real-time loading of a given BWP, may dynamically in time switch between different configured alternative resource patterns, or arrangements, configured as corresponding to the given BWP that may provide a power savings at the RAN node without having much, if any, negative impact on operation of a user equipment using other BWPs. In an embodiment, a user equipment may be configured to monitor, detect, or decode control channel information from a different BWP than a currently tuned BWP, or the user equipment may be configured to receive actual data on a different BWP. Embodiments disclosed herein may comprise BWP adaptation signaling procedures and techniques. Embodiments disclosed herein may facilitate user equipment receiving data according to one BWP and receiving other types of information, for example control channel or reference signal information, via another BWP.

Similar to existing BWP procedures, a set of baseline BWPs are defined and configured to active devices, each with certain bandwidth, subcarrier spacing, and antenna setup configurations. In addition to baseline BWPs, embodiments disclosed herein may associate a BWP to multiple possible resource patterns. A BWP resource pattern indication may indicate a change of bandwidth structure, or arrangement, of a corresponding BWP, which change may comprise de-activated resources, or updated data, control, or reference signal resources, for example. Thus, a RAN node may initially configure user equipment devices with baseline BWPs, and dynamically in time, configure the user equipment devices to switch between various BWP resource patterns. For example, for a lightly loaded BWP, a RAN node can cause a user equipment to switch to another BWP resource arrangement, according to which data resources may be de-activated for downlink and uplink transmissions, and according to which resource sets for the transmission of control channel information and reference signal signaling is updated. Such switching of a BWP arrangement for the same BWP may lead to network energy saving at the RAN node due to the partial resource shutdown (e.g., due to the deactivating of some or all data channel resources or the offloading of control channel or reference signaling to another BWP). When a number of connected devices or traffic loading corresponding to the lightly-loaded BWP rises, the RAN node can dynamically switch back to a BWP resource arrangement that offers more available data resources, for example.

Thus, the effective bandwidth and channel setup of each baseline BWP can be dynamically adjusted without the need for updating other BWP resource arrangements corresponding to other BWPs to other active user equipment devices connected to the RAN node. Moreover, as part of the proposed BWP adaptation procedures, the RAN node can dynamically enable or disable certain power-heavy channels within a certain BWP pattern. For example, the network may dynamically indicate to devices currently using a lightly loaded BWP that control channel transmission over the current BWP is to be disabled for a certain period of time. Receiving such indication of deactivating of resources for control channel information may trigger a user equipment to perform novel activities of monitoring and decoding control channel information via a different BWP (possibly with a different radio subcarrier spacing and antenna configuration) than the currently active BWP, via which control channel transmissions are temporarily de-activated. Thus, a network power saving gain may be realized since un-needed control channel transmissions are avoided for lightly loaded BWPs.

However, power consumption may increase for a user equipment that is simultaneously monitoring and receiving information via multiple BWPs via different radio signals. To mitigate such increase in power consumption by a user equipment, high-level performance thresholds can be applied to reduce the number of impacted devices. For example, offloading of control channel signaling from one BWP to another can be conditioned on a BWP that is to have resources deactivated very lightly loaded with a small number of active devices (e.g., a number of connected mode user equipment devices being below a connected mode user equipment threshold).

Figure 2:
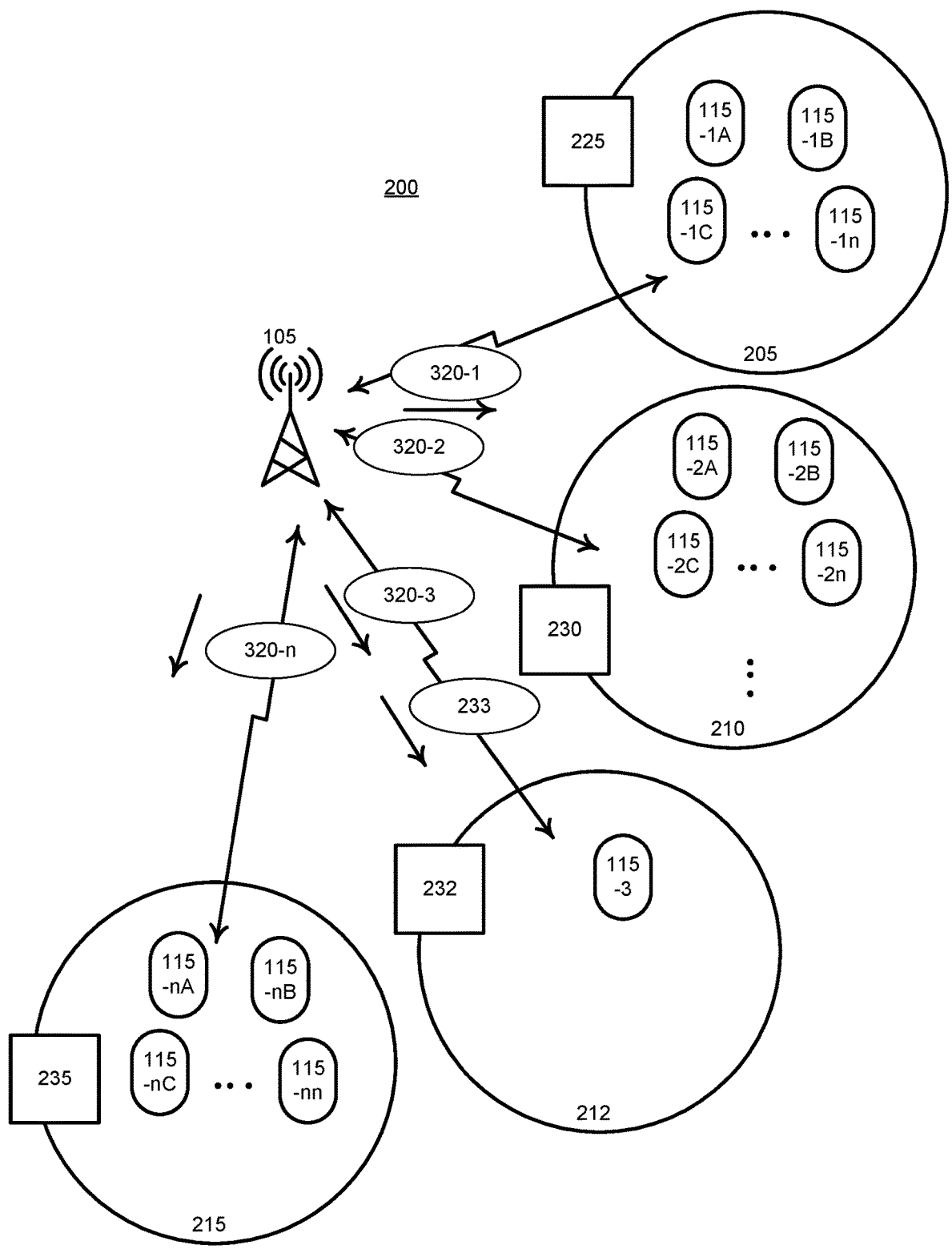
FIG. 2 illustrates an example embodiment of multiple groups of user equipment being assigned respective different bandwidth parts.

Turning now to FIG. 2, the figure illustrates an environment 200 comprising a first group, or set, 205 of user equipment 115-1A, 115-1B, 115-1C . . . 115-1n; a second group, or set, 210 of user equipment 115-2A, 115-2B, 115-2C . . . 115-2n; and an nth group of user equipment 115-nA, 115-nB, 115-nC . . . 115-nn. Groups 205, 210, and 215, may be configured to communicate with RAN 105 according to BWPs 225, 230, and 235, respectively. Lightly loaded group 212 may be deemed as lightly loaded because the group only comprises UE 115-3 that communicates with RAN 105 according to bandwidth part 232. If a change criterion, as discussed elsewhere herein, comprises a number of user equipment using BWP 232 being greater than one, then BWP 232 may be deemed as lightly loaded. RAN 105 may transmit a bandwidth part configuration to user equipment of groups 205, 210, 212, and 215. In an embodiment, the bandwidth part configuration may be the same configuration 320 transmitted to all user equipment that are connected with RAN node 105. In an embodiment, as shown in FIG. 2 the bandwidth part configuration may comprise different configurations 320-1, 320-2, 320-3, and 320-n, corresponding to bandwidth parts 225, 230, 232, and 235, respectively, transmitted to user equipment of groups 205, 210, 212, and 215, respectively.

Figure 3:
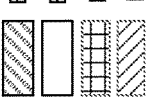
FIG. 3 illustrates an example configuration with example resource arrangements.
Figure 3:
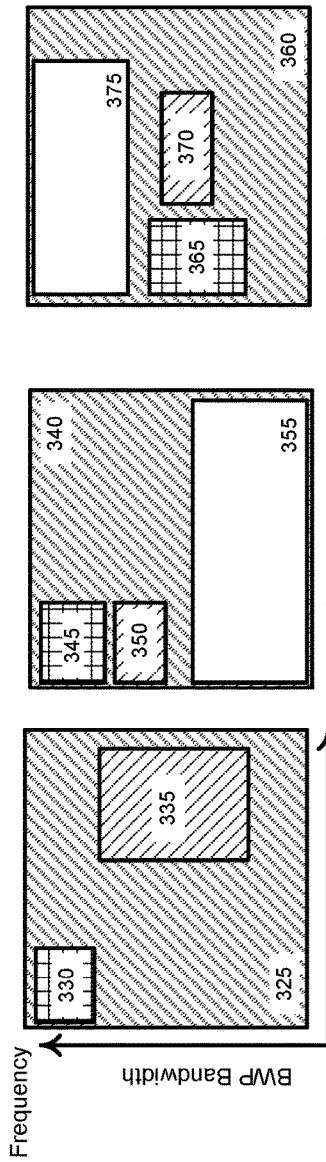
Figure 3:
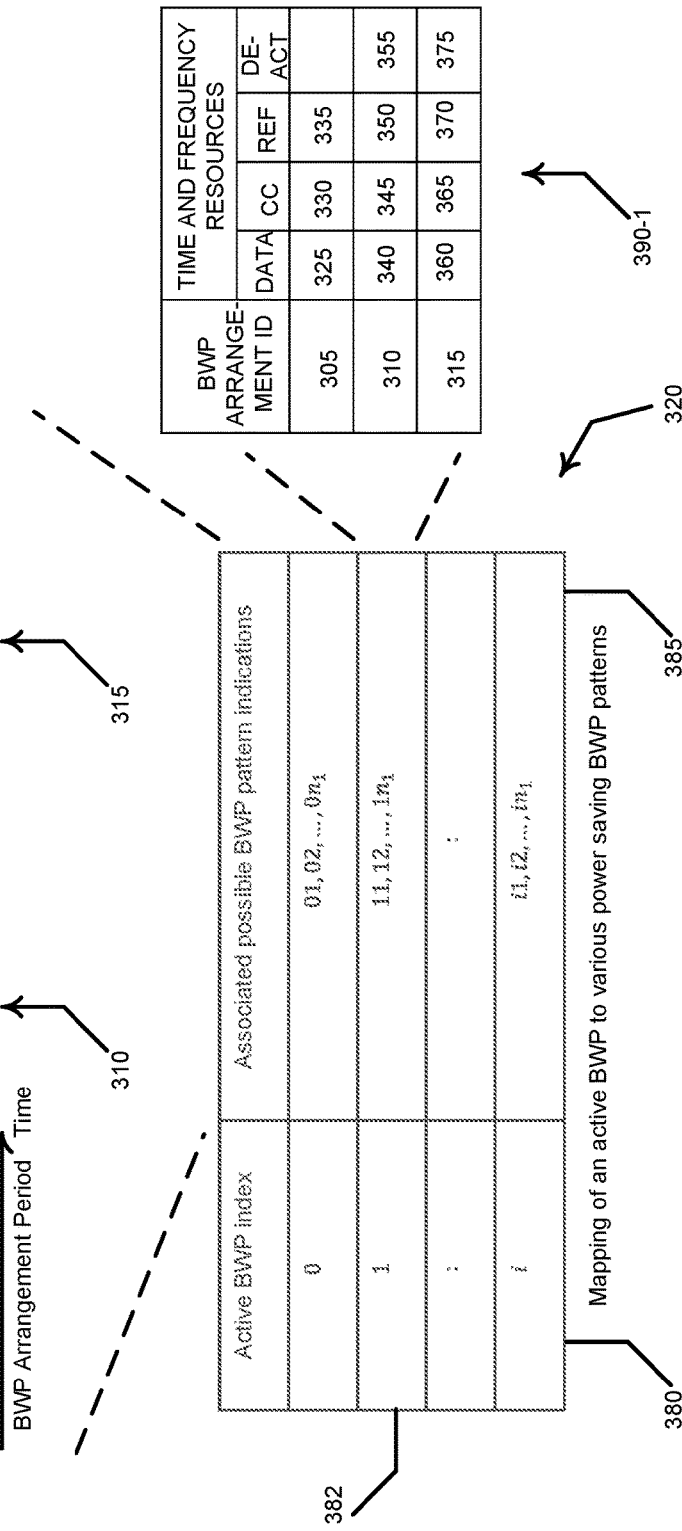

As depicted by FIG. 3, multiple BWP resource patterns, or arrangements, 305, 310, and 315 may be defined and configured to a user equipment of a group of user equipment. A BWP resource pattern, or arrangement, may refer to a certain set of radio resources. Different resource arrangements may designate time or frequency resources for different uses, for example, data traffic, control channel traffic, or reference signal traffic, or deactivated resource 'space'. In an embodiment, a resource, spanning time and frequency ranges of a given BWP, may be temporarily deactivated such that the deactivated resources are not used for transmission of data, control, or reference signals. During a period of resource deactivation according to a bandwidth part arrangement, a RAN node may avoid transmitting signals via deactivated frequencies. In another embodiment, a bandwidth part resource arrangement may comprise an update, or revision, relative to a previously used, or currently used, bandwidth part, such as a baseline bandwidth part, to resources to be used for data transmissions or receptions. In another embodiment, a bandwidth part resource arrangement may comprise an update, or revision, relative to a previously used, or currently used, bandwidth part, such as a baseline bandwidth part, to control channel resource sets to be used for device-specific (e.g., to be used by UE 115-1A shown in FIG. 2), or group-common control search spaces (e.g., to be used by the UEs that comprise group 205 shown in FIG. 2). Continuing with description of FIG. 3, in another embodiment, a bandwidth part resource arrangement may comprise an update, or revision, relative to a previously used, or currently used, bandwidth part, such as a baseline bandwidth part, to reference signal resource sets to be used for downlink and uplink reference signal transmissions.

As shown in FIG. 3, BWP arrangement 305 comprises data time and frequency resources 325, control channel search space resources 330, and reference signal resources 335 to be used for transmitting reference signals, such as, for example, signals that may be transmitted via SSB signaling. In addition to data time and frequency resources 340, control channel search space resources 345, and reference signal resources 350, BWP arrangement 310 comprises deactivated time and frequency resources 355. Accordingly, during an active BWP period corresponding to BWP 310, a RAN operating according to BWP 310 would not transmit signals using frequencies corresponding to deactivated resource 355, thus saving energy at the RAN node due to only using power for data, control channel, or reference signals according to resources 340, 345, and 350, respectively, and not using power for transmission during a deactivation period and at frequencies corresponding to deactivated resources 355. Similarly, a RAN operating according to BWP 315 would not transmit signals using frequencies corresponding to deactivated resource 375 and would only use power during an active period of BWP 315 to transmit data, control channel, or reference signaling using resources 360, 365, and 370, respectively.

A bandwidth part configuration 320 may be transmitted by a RAN to a user equipment. BWP configuration 320 may comprise a bandwidth part index field 380 and a resource arrangement indication field 385. In an example, a user equipment may be configured to communicate with a RAN node according to bandwidth part 1, as indicated in the second row 382 in field 380 shown in FIG. 3. Field 385 may comprise identifiers of one or more bandwidth part arrangements corresponding to bandwidth parts identified in field 380. The user equipment may receive from the radio access network node a bandwidth part change indication indicative of the RAN node having determined to change operation of bandwidth 1 from operation according to resource arrangement 305 to operation according to resource arrangement 310. The bandwidth part change indication may be an identifier corresponding, in arrangement configuration 390-1 (arrangement configuration 390 may be part of configuration 320 and the '-1' indicates resource sets corresponding to arrangements 305, 310, and 315 shown in row 382 as being associated with bandwidth part 1). Thus, a user equipment configured to operate using bandwidth part 1, and that is currently operating according to time and frequency resources corresponding to arrangement 305, may receive a bandwidth part change indication from a RAN node serving the UE indicating a change to arrangement 310. The user equipment may look up in configuration 390-1 (of configuration 320) the timing and frequency resources corresponding to data resources 340, control channel resources 345, reference signals 350, and deactivated resources 355 and use those resources instead of using resources specified by arrangement 305. Accordingly, the RAN node saves power by not transmitting, and the UE does not expend processing and battery resources attempting to decode, signals at the frequencies of deactivated resource set 355 during the deactivated resource time indicated as corresponding to resource arrangement 310 in configuration 390-1 of configuration 320. The RAN node and UE may continue to communicate data according to resources 340, control information according to resources 345, and reference signaling according to resources 350 during an active period of arrangement 310. A bandwidth part active period may be indicated in configuration 320.

A RAN node may determine to change from use of bandwidth part 1 according to arrangement 305 to arrangement 310 to save power for a lightly loaded bandwidth part 1. For example, if bandwidth part 1 shown in FIG. 3 corresponds to bandwidth part 232 shown in FIG. 2 where UE 115-3 is the only UE using bandwidth part 232, RAN 105 may reduce power consumption by deactivating resources 255 without impacting UE 115-3. And, because bandwidth part change indication 233 (shown in FIG. 2) is only transmitted to user equipment using bandwidth part 232 (e.g., user equipment of group 212 shown in FIG. 2), user equipment of groups 205, 210, or 215 may not be affected because bandwidth parts 225, 230, and 235 are not changed and the change made to bandwidth part 232 is not even indicated to user equipment of groups 205, 210, or 215.

In an example, a RAN node may configure user equipment with a mapping list, or configuration, 320 of an active baseline BWP and additional possible alternative BWP resource patterns, or arrangement, as shown by FIG. 3. Transmission of configuration 320 can be part of radio resource control ("RRC") setup signaling procedures. Different BWP resource patterns/arrangements, associated with a certain baseline BWP, may share the same bandwidth and same radio setup in terms of communication subcarrier spacing, and transmit antenna configuration, respectively. Therefore, a RAN node may dynamically, on-the-fly, transmit, towards active devices, indications, such as bandwidth part change indication 233 shown in FIG. 2, of a BWP pattern/arrangement of resources to use via downlink control information ("DCI") signaling.

Figure 4A:
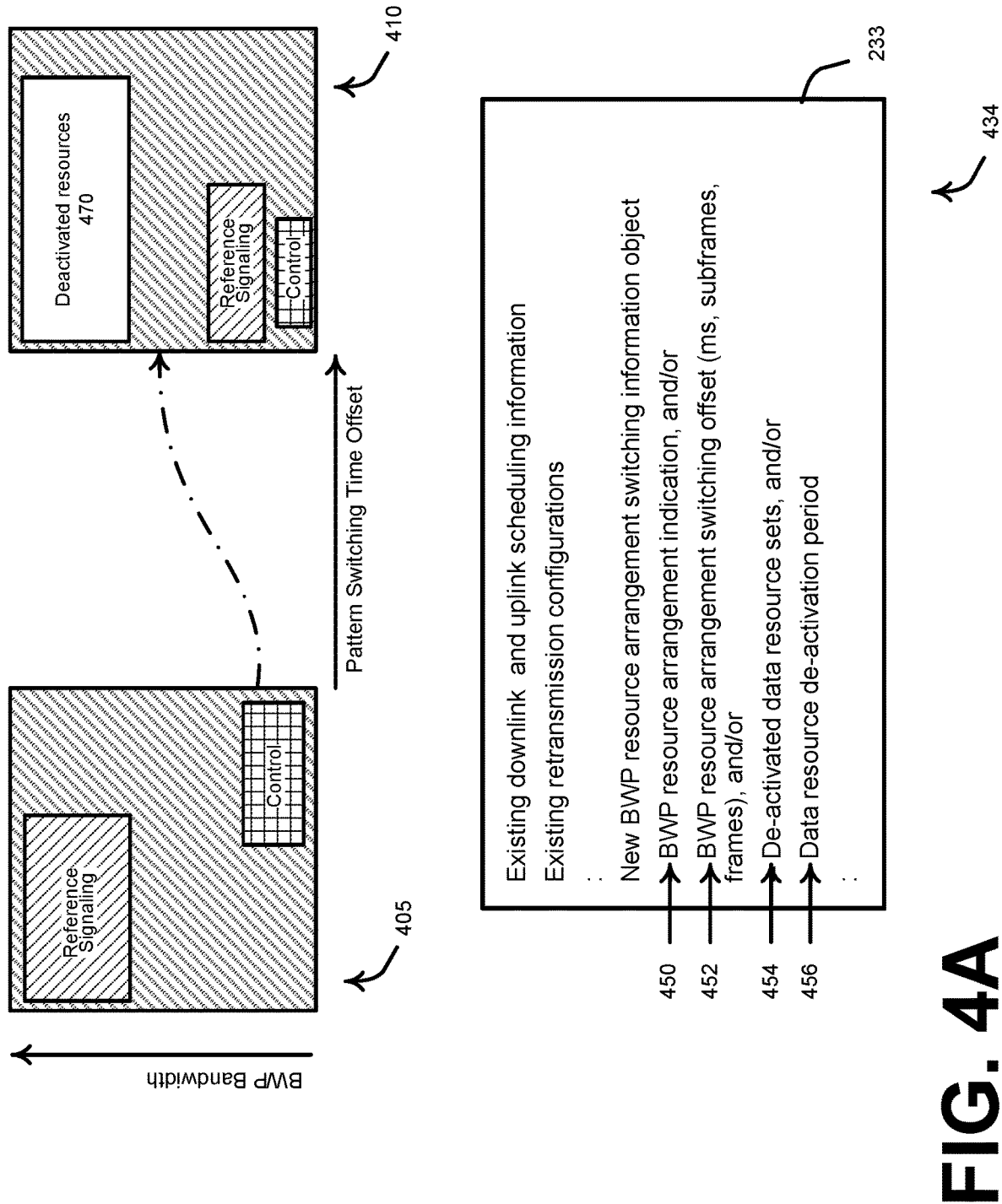
FIG. 4A illustrates an example bandwidth part for which a current resource arrangement is changed to a resource arrangement with deactivated data resources.

As shown in FIG. 4A, a RAN node may dynamically configure a UE device with an initial baseline BWP arrangement 405, which may meet a quality-of-service requirement of the UE. On condition of a power consumption constraint at the RAN node or BWP 405 being determined to be lightly loaded, the RAN node may dynamically indicate to a user equipment that is using BWP 405 to switch to operation according to arrangement 410, which may be configured by a mapping list/configuration, such as configure 320 shown in FIG. 3. Switching from a current BWP arrangement, which may be a baseline BWP resource arrangement or an arrangement other than a baseline arrangement, to an updated BWP arrangement pattern may be indicated by bandwidth part change indication 233, according to format 434, to be executed at a certain starting time in the future or with a time offset from a time when the change/switching indication is received. Bandwidth part change indication 233 that is indicative of a new/updated BWP pattern arrangement, and corresponding starting time information, can be transmitted during occasions of device-specific or device-group-common control channel resources according to BWP resource arrangement 405. As shown in FIG. 4A, the target BWP resource arrangement 410 comprises indication of de-activated resources, which are not to be utilized during the active time of the BWP pattern 410 for radio operations. Thus, the RAN node can idle transceivers for the corresponding time and frequency resources indicated as being deactivated in arrangement 410, thus leading to a power consumption reduction.

Figure 4B:
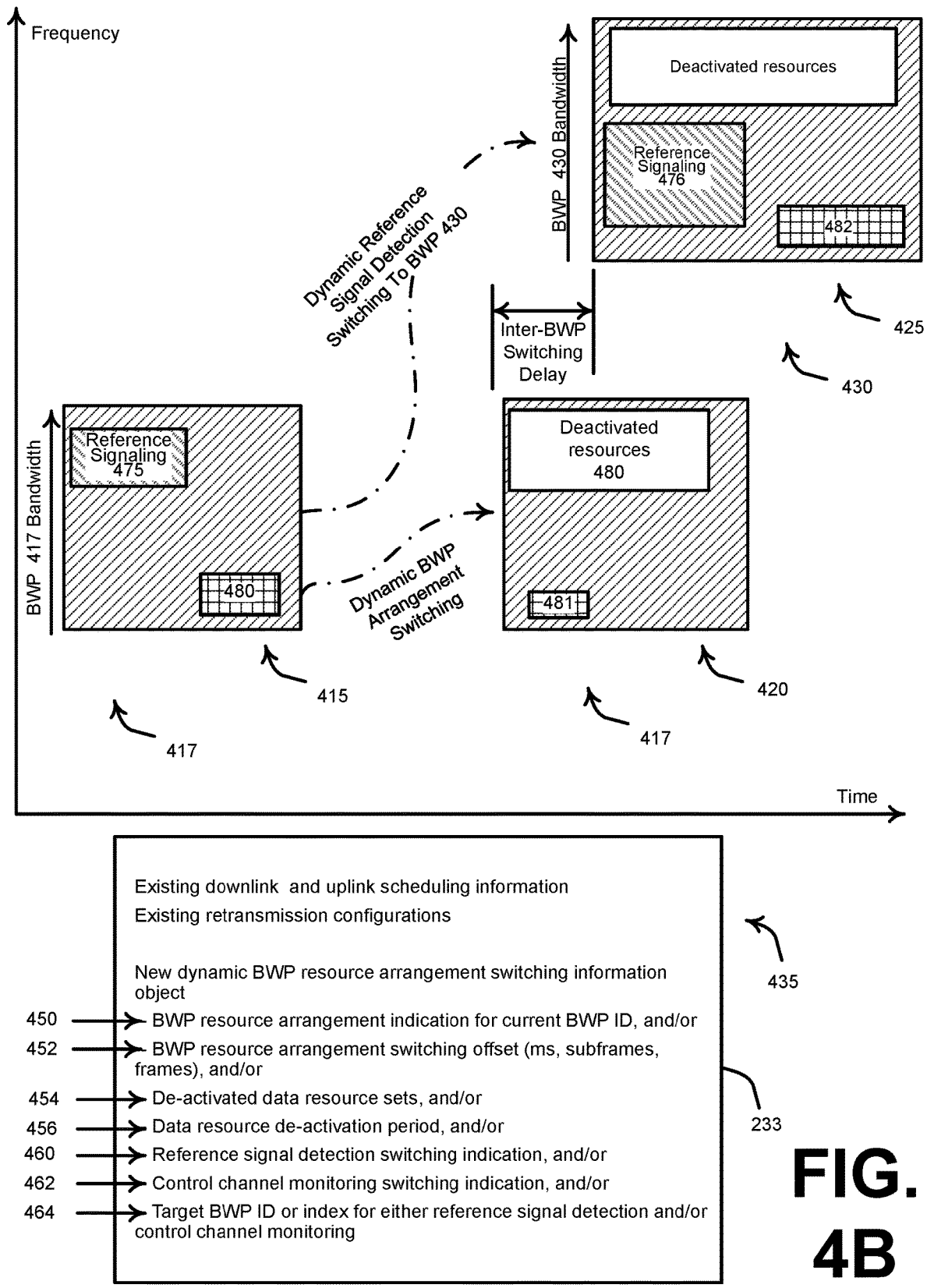
FIG. 4B illustrates an example bandwidth part for which a current resource arrangement is changed to a resource arrangement with deactivated data resources and for which reference signaling is offloaded to a different bandwidth part.

In another example embodiment, shown in FIG. 4B, a RAN node can dynamically configure user equipment with an initial baseline BWP 415 and can indicate to certain of the user equipment to switch to operation with the RAN according to another BWP pattern/arrangement. The RAN may then disable one or more radio operations or channels according to the other BWP arrangement/pattern to which the RAN indicated to the UE to switch. In the embodiment shown in FIG. 4B, reference signal transmissions are disabled during BWP pattern 420. Bandwidth part arrangements 415 and 420 are different bandwidth part arrangements of bandwidth part 417. Thus, UE devices that have been instructed to switch from use of bandwidth part arrangement 415 to bandwidth part arrangement 420 may also be instructed to monitor and decode downlink reference signals or to transmit uplink reference signals over resources of bandwidth part arrangement 425 corresponding to a different bandwidth part 430 than bandwidth part 417.

Thus, as part of a bandwidth part change indication 233 according to format 435, a RAN may configure user equipment devices to monitor and receive, or transmit, reference signals via another active BWP, possibly with a different radio setup for the different bandwidth part. Such switching to multiple bandwidth part usage by a user equipment may facilitate a significant NES gain being achieved due to the combination of deactivating resources of BWP pattern 415, and offloading of control channel support (e.g., offloading reference signal transmission) from the lightly loaded BWP to another BWP 430. However, a user equipment having to monitor and decode signals according to not only two different bandwidth part arrangements 420 and 425 but having to also monitor signals corresponding to two different bandwidth parts 417 and 430 may increase power consumption due to receiving and decoding two simultaneously active BWPs of different radio configurations. Such increase in power consumption by a user equipment may be somewhat ameliorated by setting an arrangement change criterion, or switching condition criterion, such that a RAN is configured, for example, to be barred from channel offloading over multiple BWPs except if there is a lightly loaded BWP (e.g., a small number of active devices), thus reducing the number of user equipment devices that may be harmed, from a power use perspective or processing perspective, by having to monitor and decode two different bandwidth parts.

To facilitate BWP arrangement adaptation embodiments disclosed herein, user equipment devices may be configured to switch between BWP patterns based on receiving a bandwidth part change indication 233 according to bandwidth part change indication format 434 or indication format 435 via DCI signaling. A bandwidth part change indication according to formats 434 or 435 may comprise a target BWP arrangement indication indicative of a bandwidth part arrangement for a UE to adopt. Based on a high-level RRC configuration of a BWP-to-pattern mapping list, for example configuration 320, indication format 434 or indication format 435 may indicate a BWP arrangement identifier 450 that is associated with a currently active baseline BWP (e.g., a BWP indicated in field 380 in FIG. 3). Indication format 434 or indication format 435 may comprise a BWP arrangement switching offset 452 that may indicate a time offset after which the target BWP arrangement becomes active (e.g., when a resource arrangement indicated in a bandwidth part indication, such as bandwidth part change indication 233, is to be implemented). The time can be an absolute frame or slot number or can be given in terms of a number of slots/frames starting from the time instant the switching indication is received. Indication format 434 or indication format 435 may comprise a deactivate indication 454 of a set of data resources, for example timing and frequency information, that are to be temporarily deactivated according to the corresponding arrangement identifier 450. For example, in reference to FIG. 4A, deactivate indication 454 may indicate that resources 470 are to be deactivated according to resource arrangement 410. Upon receiving and implementing a change according to an indication 454 of deactivated data resource set 470, user equipment devices may skip monitoring deactivated resources 470.

Indication format 434 or indication format 435 may comprise a deactivation period indication 456, which deactivation period may comprise a period during which the indicated deactivated data resource sets, or resource sets assigned for other purposes, are not active. In an embodiment, indication 456 may indicate an active period of resource arrangement 410, for example. After such deactivation period, activation of data resources (or control channel resources of reference signal resources if indicated in message 233) may resume and user equipment may assume that resources allocated for data, or other purposes, that were deactivated during the deactivation period indicated by 456 are available again. For example, in an embodiment, after a period indicated in 456 to implement resource arrangement 410 expires, a user equipment may resume monitoring resources that were indicated as being deactivated resources 470. In another embodiment, after a period indicated in 456 to implement resource arrangement 410 expires, a user equipment may revert to operation according to resource arrangement 405.

Indication format 435 may further comprise indication of channel offloading (e.g., reference signaling or control channel) and may indicate to UE devices whether channels (e.g., for reference signal transmissions or control information transmissions) are disabled or enabled during an active BWP resource arrangement. Indication format 435 may comprise an offload BWP identifier 464 for channel offloading that indicates to a user equipment an identifier of a target BWP and associated resources to be used to take over support for an offloaded channel. For example, reference signal signaling using resources 475 of bandwidth part 417 may be indicated by reference signal offloading indication 460 as being offloaded to resources 476 of bandwidth part 430 according to arrangement 425. Control channel offloading indication 462 may indicate that fewer control channel resources may be allocated in BWP 417 according to resource arrangement 420 than in BWP 417 according to resource arrangement 415 (as indicated by resource 481 being smaller than resource 480 in FIG. 4B). Control channel offloading indication 462 may also indicate that control channel resources may be partially offloaded to resource set 482 in bandwidth part 430 (partially offloaded as shown by control channel support being facilitated by resources 482 of BWP 430 and also being facilitated by resources 481 of BWP 417). A user equipment may monitor BWP resources indicated by indication 464 instead of resources of the BWP indicated in 450 as being deactivated by, for example indication 454 or indication 456.

Figure 5:
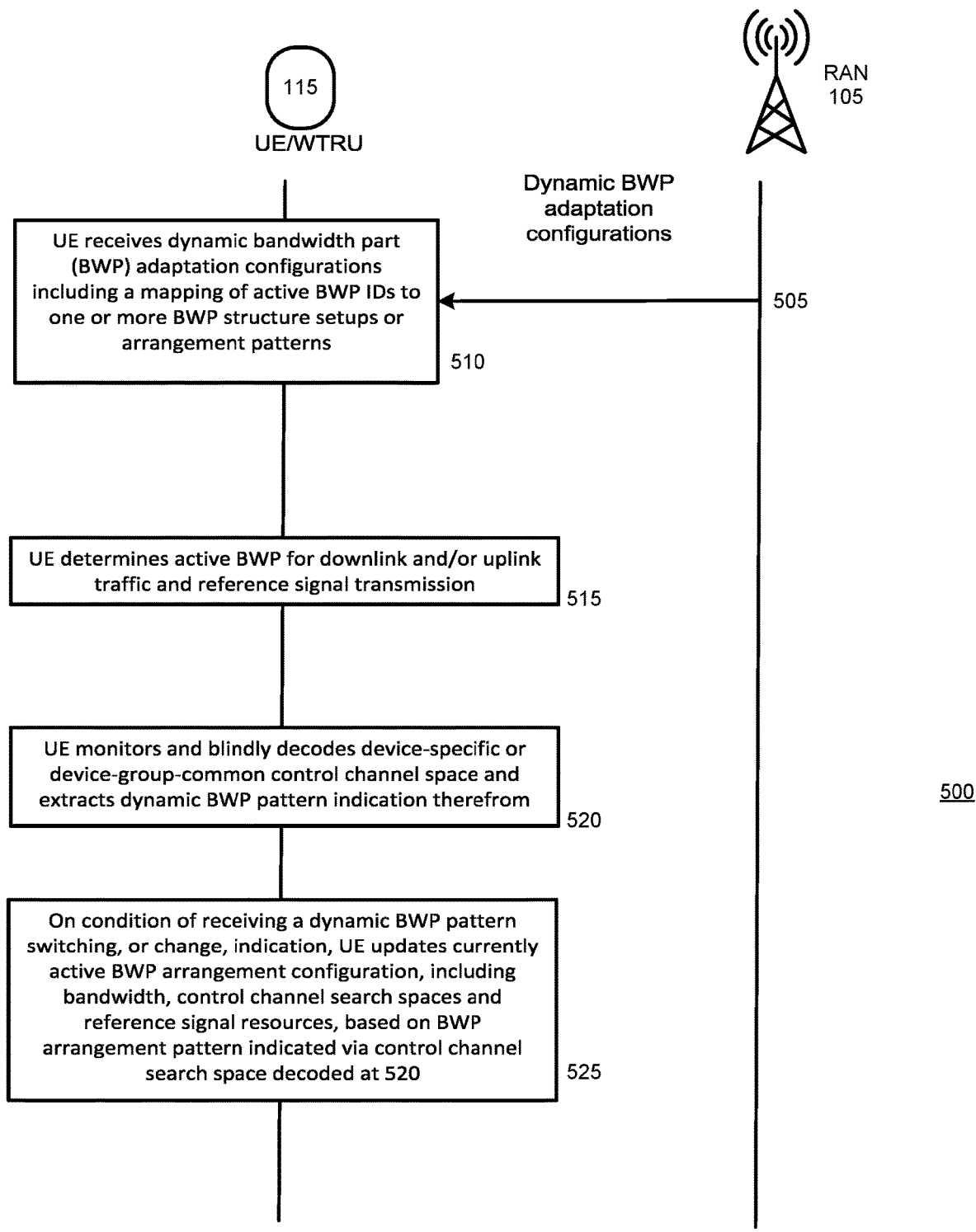
FIG. 5 illustrates a timing diagram of an example embodiment of adaptively implementing a change in bandwidth part arrangement.

Turning now to FIG. 5, the figure illustrates a timing diagram of an example method 500. At act 505, RAN 105 transmits and UE 115 receives at act 510 a dynamic bandwidth part (BWP) adaptation configuration (e.g., configuration 320 described in reference to FIG. 3) that may comprise a mapping list of an active BWP identifier to one or more BWP resource structure arrangements. Continuing with description of FIG. 5, UE 115 may determine at act 515 an active BWP for downlink and/or uplink traffic and reference signal transmissions. At act 520, UE 115 may monitor and blindly decode device-specific or group-common control channel space and extract a dynamic BWP arrangement change indication (e.g., bandwidth part change indication 233). At act 525, on condition of receiving a dynamic bandwidth part change indication at act 520, UE 115 may update a currently active BWP arrangement configuration, including bandwidth, control channel search spaces, and reference signal resources, based on the BWP change indication received at act 520, and begin operation according to an updated BWP arrangement (or arrangements in case of channel offloading, for example).

Figure 6:
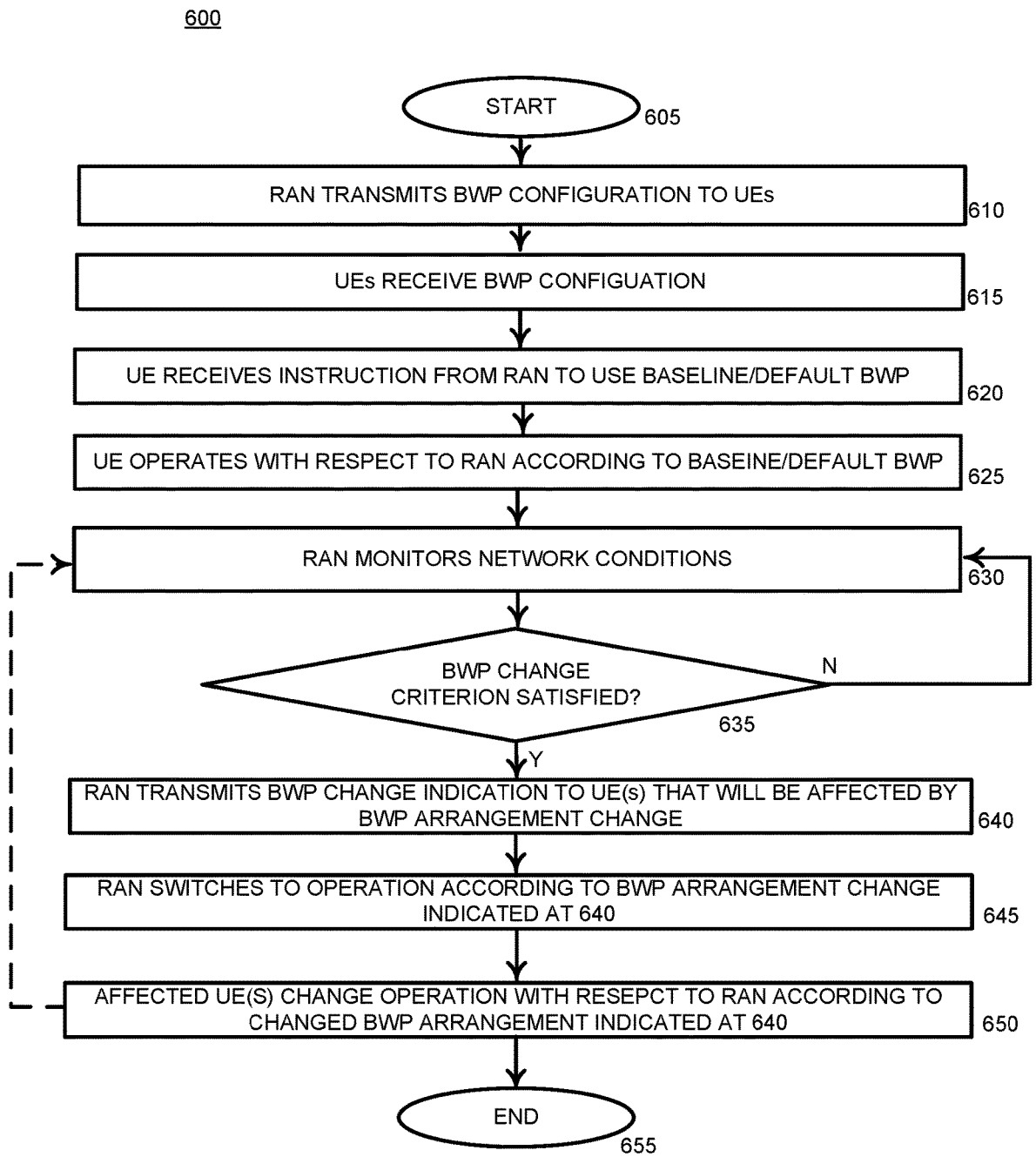
FIG. 6 illustrates flow diagram of an example embodiment method of adaptively changing an arrangement of resources of a bandwidth part.

Turning now to FIG. 6, the figure illustrates a flow diagram of an example method 600. Method 600 begins at act 605. At act 610, the radio access network node may transmit a bandwidth part configuration to user equipment devices, which may receive the bandwidth part configuration at act 615. An example bandwidth of a part configuration may be configuration 320 described in reference to FIG. 3. At act 620, the radio access network node may transmit, to certain user equipment, for example, one or more user equipment of a group, or set, of user equipment as described in reference to FIG. 2, an indication to use a bandwidth part assigned to the certain user equipment. The instruction may comprise an instruction to use a baseline, default, bandwidth part arrangement corresponding to the assigned bandwidth part. The user equipment to which the instruction at act 620 was directed may begin operation at act 625 according to the bandwidth part and corresponding baseline bandwidth part arrangement indicated at act 620.

At act 630, the radio access network node may monitor network conditions, for example, radio congestion, radio interference, load balancing of user equipment among different bandwidth parts, usage of each of multiple different bandwidth parts by user equipment, power conditions at the radio access network node (e.g., whether the radio access network node is operating on battery power), and the like. At act 635, the radio access network node may determine whether a bandwidth change criterion is satisfied by conditions monitored and determined at act 630, for example, whether a particular bandwidth part is lightly loaded. In an example of a lightly loaded BWP, fewer user equipment than a configured usage criterion corresponding to the bandwidth part may be connected with the radio access network node according to the particular bandwidth part, and the radio access network node may determine to change a bandwidth part resource arrangement that is/are currently being used to serve user equipment that are connected with the radio access node according to the particular bandwidth part. In another example, the radio access network node may determine that a battery power supply is a source of power for the radio access network node, and the node may determine to change a bandwidth part resource arrangement of a particular bandwidth part to reduce power consumption at the radio access network node. In another example, the radio access network node may analyze usage of a particular bandwidth part with respect to a combination of bandwidth part change criteria, for example, if the radio access network node is receiving power from a battery and a particular bandwidth part is lightly loaded, the radio access network node may determine to change operation of the particular bandwidth part according to a bandwidth part arrangement that may deactivate some time or frequency resources of the bandwidth part.

If the radio access network node determines at act 635 that a bandwidth part change criterion is not satisfied, method 600 returns to act 630, and the radio access network node continues to monitor network conditions. If, however, the radio access network node determines at act 635 that network conditions satisfy a bandwidth part change criterion, or criteria, method 600 advances from act 635 to act 640.

At act 640, the radio access network node transmits a bandwidth part change indication to user equipment that may be affected by a change in a bandwidth part arrangement corresponding to a bandwidth part according to which the user equipment may be currently using to communicate with the radio access network node. The user equipment to which a bandwidth part change indication is transmitted may comprise only user equipment that are currently using the bandwidth part to which the bandwidth part change indication corresponds. For example, in reference to FIG. 2, radio access network node 105 may transmit a bandwidth part change indication message 233 to user equipment that are currently using lightly loaded bandwidth part 232 (e.g., the bandwidth part change indication message is only transmitted to UE 115-3 in FIG. 2), but the bandwidth part change indication message is not transmitted to user equipment of user equipment groups 205, 210, or 215 that are currently configured to use resources corresponding to bandwidth parts 225, 230, or 235, respectively. Thus, signaling and processing overhead are not used to indicate changes of bandwidth part arrangements to user equipment corresponding to groups for which a bandwidth part is not being changed. Moreover, resource arrangements corresponding to bandwidth parts being used by user equipment that are not indicated by the bandwidth part change indication message transmitted at act 640 are not changed by the radio access network node. Accordingly, user equipment that do not receive a bandwidth part change indication are typically unaffected by the change in bandwidth part arrangement indicated by the bandwidth part change indication transmitted at act 640. It will be appreciated that in some situations user equipment to which the bandwidth part change indication was not directed at act 640 may nevertheless be affected by a change in bandwidth part arrangement as indicated in the bandwidth part indication transmitted at act 640. For example, if such indicated bandwidth part arrangement change causes offloading of functionality, for example control channel or reference signaling being deactivated for the bandwidth part being changed, to one or more other bandwidth parts that are currently being used by user equipment and to which the bandwidth part change indication at act 640 does not indicate a change, all user equipment using the bandwidth that is now supporting functionality from another bandwidth part may experience some performance degradation. However, a RAN may determine not to transmit a bandwidth part change indication indicative of offloading if doing so would likely cause a severe degradation of performance with respect to user equipment that were already using the bandwidth part that took over the offloaded functionality. Such a determination not to transmit a bandwidth part change indication that indicates offloading may be made act 635 by determining that network conditions do not satisfy a bandwidth part change criterion due to the impact on user equipment using the bandwidth part that might otherwise be used for offloaded channel functionality.

At act 645, the radio access network node switches operation to operation according to the resource arrangement indicated in the indication transmitted at act 640. At act 650, user equipment affected by change in a bandwidth part resource arrangement indicated in the bandwidth part change indication transmitted at act 640 change operation with respect to the radio access network node according to resources indicated in the bandwidth part change indication transmitted at act 640. Method 600 advances to act 655 and ends.

It will be appreciated that some of the steps of method 600 may be performed repetitively, or in a loop, and therefore control after act 650 is shown in FIG. 6 with a dashed line returning to act 630. At a next iteration at act 630, the radio access network node may continue to monitor network conditions and determine another change in network conditions, which may alter previous analysis with respect to a change criterion at act 635, and thus another change to a bandwidth part resource arrangement may be determined. For example, a RAN may determine to switch back to a previously implemented BWP resource arrangement, or another BWP resource arrangement, if power from an off-site power source that may have provided power to the radio access network node, the loss of power from such source having triggered a determination at act 635 that a criterion was satisfied, is restored, such that the radio access network node is no longer operating on battery power. In another example, a RAN may determine to switch back to a previous, or another, bandwidth part resource arrangement if a bandwidth part that was determined at act 635 to be lightly loaded is no longer lightly loaded. Responsive to such condition changes altering a previous analysis determined at act 635, the radio access network node may again determine that a change in bandwidth part resource arrangement may be justified at act 635 and acts 640, 645, and 650 may be repeated.

Figure 7:
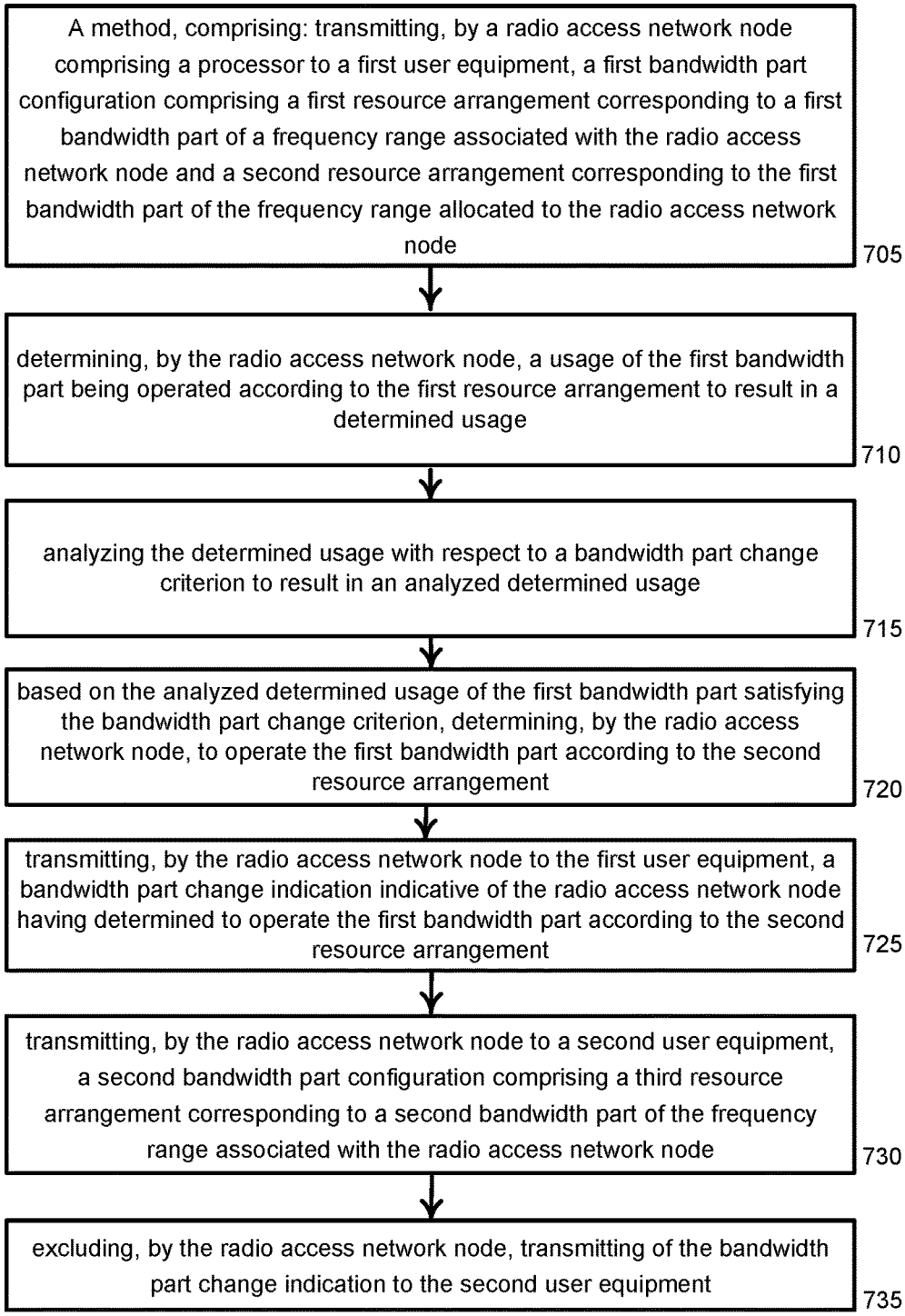
FIG. 7 illustrates a block diagram of an example method embodiment.

Turning now to FIG. 7, the figure illustrates an example embodiment method 700 comprising at block 705 transmitting, by a radio access network node comprising a processor to a first user equipment, a first bandwidth part configuration comprising a first resource arrangement corresponding to a first bandwidth part of a frequency range associated with the radio access network node and a second resource arrangement corresponding to the first bandwidth part of the frequency range allocated to the radio access network node; at block 710 determining, by the radio access network node, a usage of the first bandwidth part being operated according to the first resource arrangement to result in a determined usage; at block 715 analyzing the determined usage with respect to a bandwidth part change criterion to result in an analyzed determined usage; at block 720 based on the analyzed determined usage of the first bandwidth part satisfying the bandwidth part change criterion, determining, by the radio access network node, to operate the first bandwidth part according to the second resource arrangement; at block 725 transmitting, by the radio access network node to the first user equipment, a bandwidth part change indication indicative of the radio access network node having determined to operate the first bandwidth part according to the second resource arrangement; at block 730 transmitting, by the radio access network node to a second user equipment, a second bandwidth part configuration comprising a third resource arrangement corresponding to a second bandwidth part of the frequency range associated with the radio access network node; and at block 735 excluding, by the radio access network node, transmitting of the bandwidth part change indication to the second user equipment.

Figure 8:
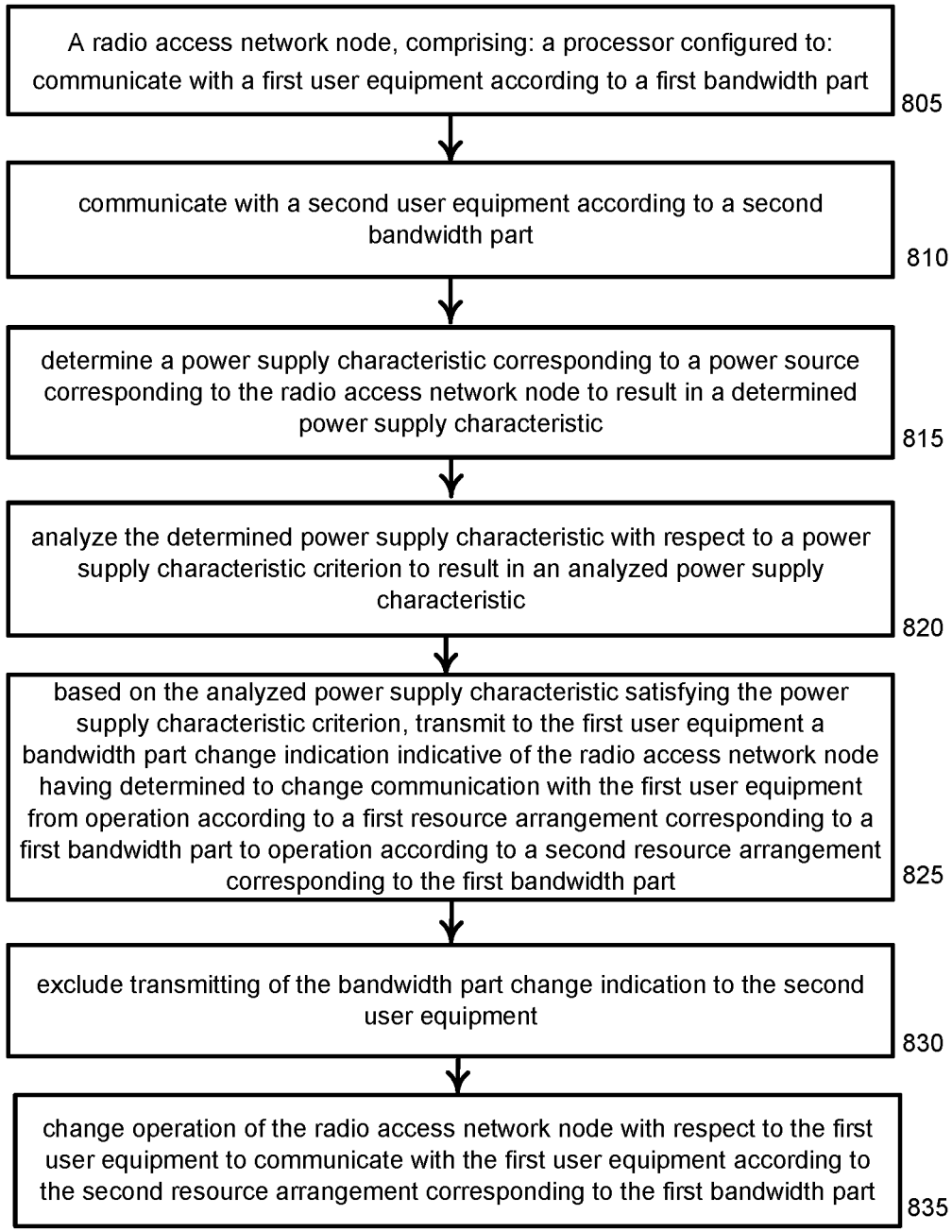
FIG. 8 illustrates a block diagram of an example radio access network node.

Turning now to FIG. 8, the figure illustrates an example radio access network node, comprising at block 805 a processor configured to communicate with a first user equipment according to a first bandwidth part; at block 810 communicate with a second user equipment according to a second bandwidth part; at block 815 determine a power supply characteristic corresponding to a power source corresponding to the radio access network node to result in a determined power supply characteristic; at block 820 analyze the determined power supply characteristic with respect to a power supply characteristic criterion to result in an analyzed power supply characteristic; at block 825 based on the analyzed power supply characteristic satisfying the power supply characteristic criterion, transmit to the first user equipment a bandwidth part change indication indicative of the radio access network node having determined to change communication with the first user equipment from operation according to a first resource arrangement corresponding to a first bandwidth part to operation according to a second resource arrangement corresponding to the first bandwidth part; at block 830 exclude transmitting of the bandwidth part change indication to the second user equipment; and at block 835 change operation of the radio access network node with respect to the first user equipment to communicate with the first user equipment according to the second resource arrangement corresponding to the first bandwidth part.

Figure 9:
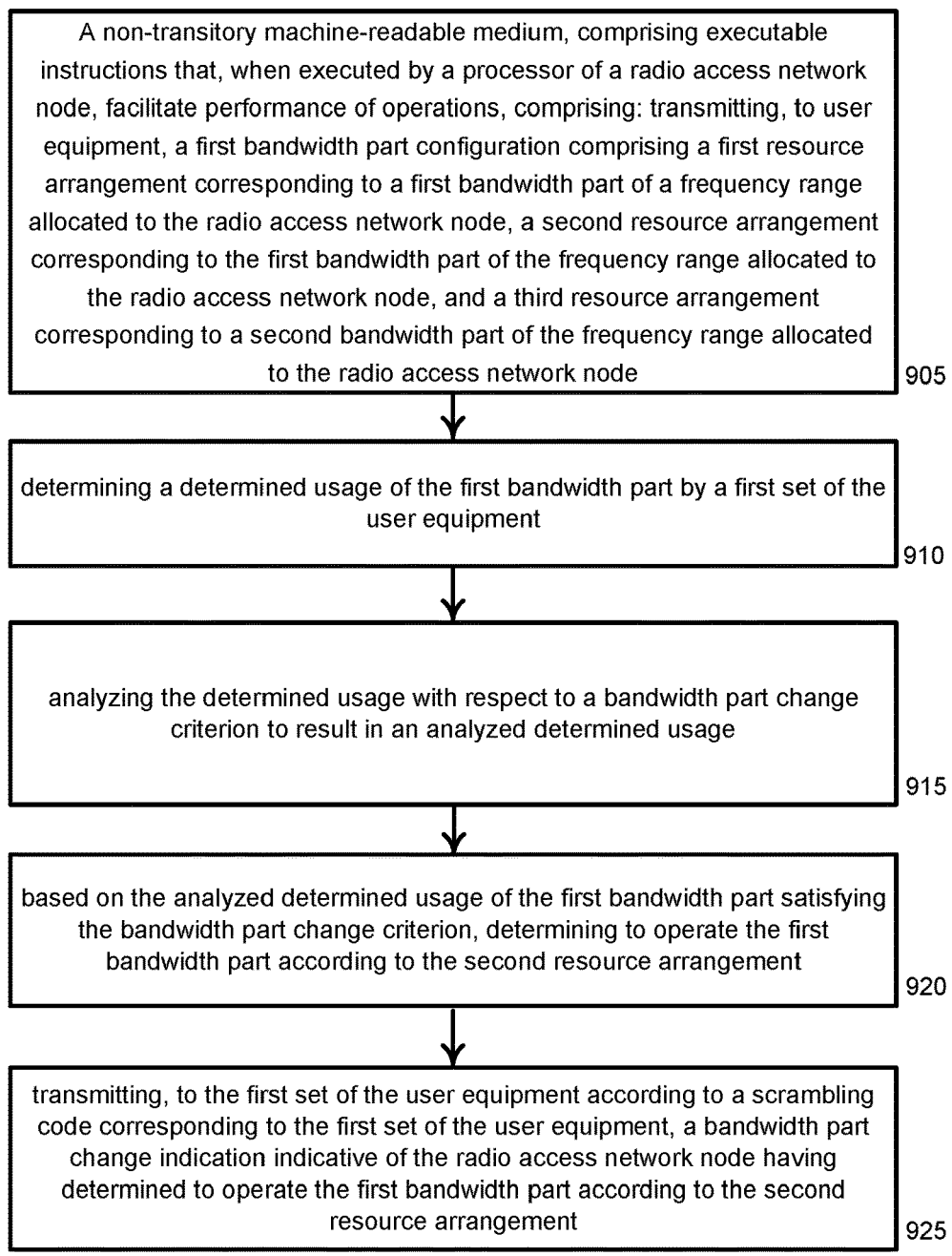
FIG. 9 illustrates a block diagram of an example non-transitory machine-readable medium embodiment.

Turning now to FIG. 9, the figure illustrates a non-transitory machine-readable medium 900 comprising at block 905 executable instructions that, when executed by a processor of a radio access network node, facilitate performance of operations, comprising transmitting, to user equipment, a first bandwidth part configuration comprising a first resource arrangement corresponding to a first bandwidth part of a frequency range allocated to the radio access network node, a second resource arrangement corresponding to the first bandwidth part of the frequency range allocated to the radio access network node, and a third resource arrangement corresponding to a second bandwidth part of the frequency range allocated to the radio access network node; at block 910 determining a determined usage of the first bandwidth part by a first set of the user equipment; at block 915 analyzing the determined usage with respect to a bandwidth part change criterion to result in an analyzed determined usage; at block 920 based on the analyzed determined usage of the first bandwidth part satisfying the bandwidth part change criterion, determining to operate the first bandwidth part according to the second resource arrangement; and at block 925 transmitting, to the first set of the user equipment according to a scrambling code corresponding to the first set of the user equipment, a bandwidth part change indication indicative of the radio access network node having determined to operate the first bandwidth part according to the second resource arrangement.

Figure 10:
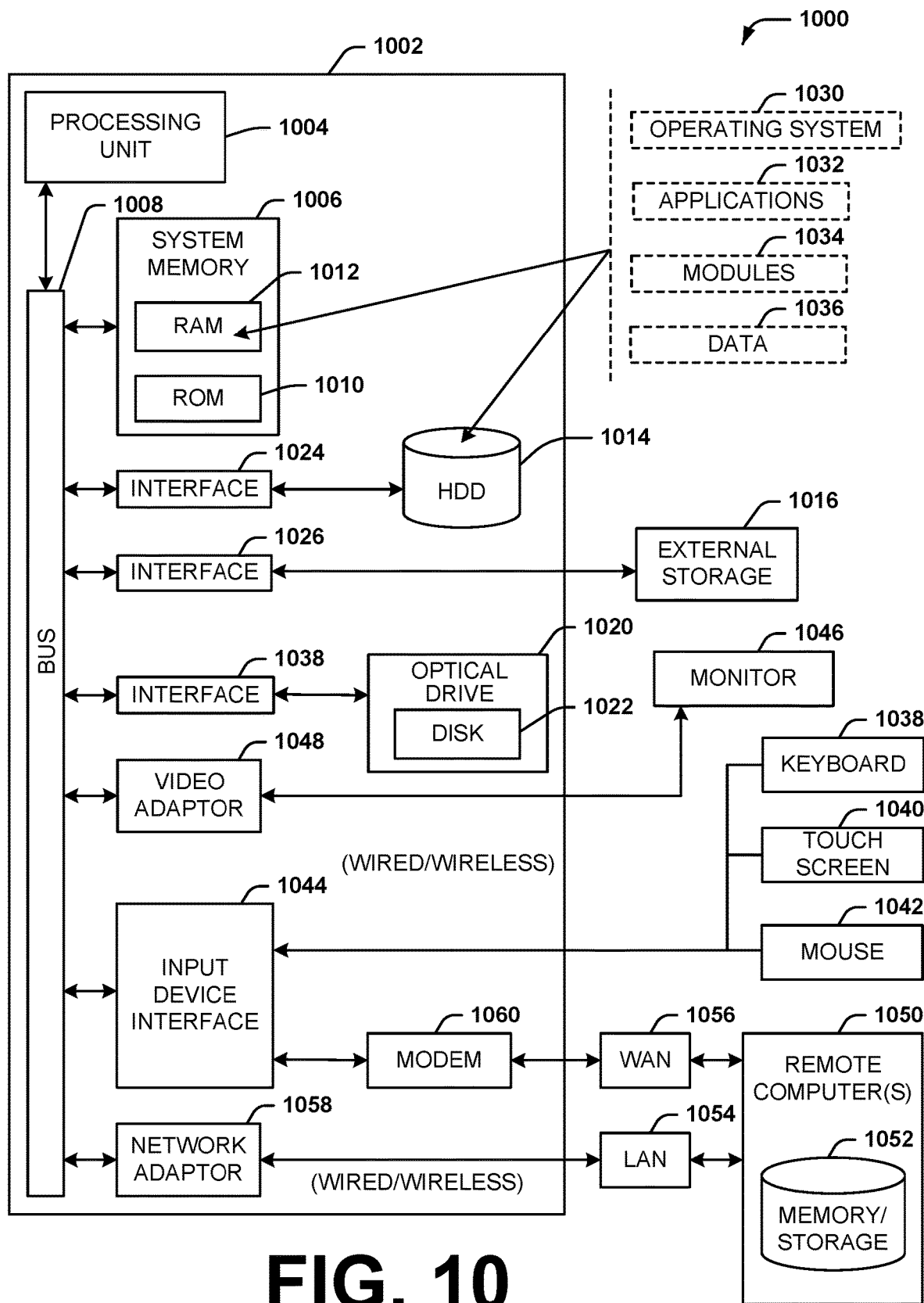
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1010. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
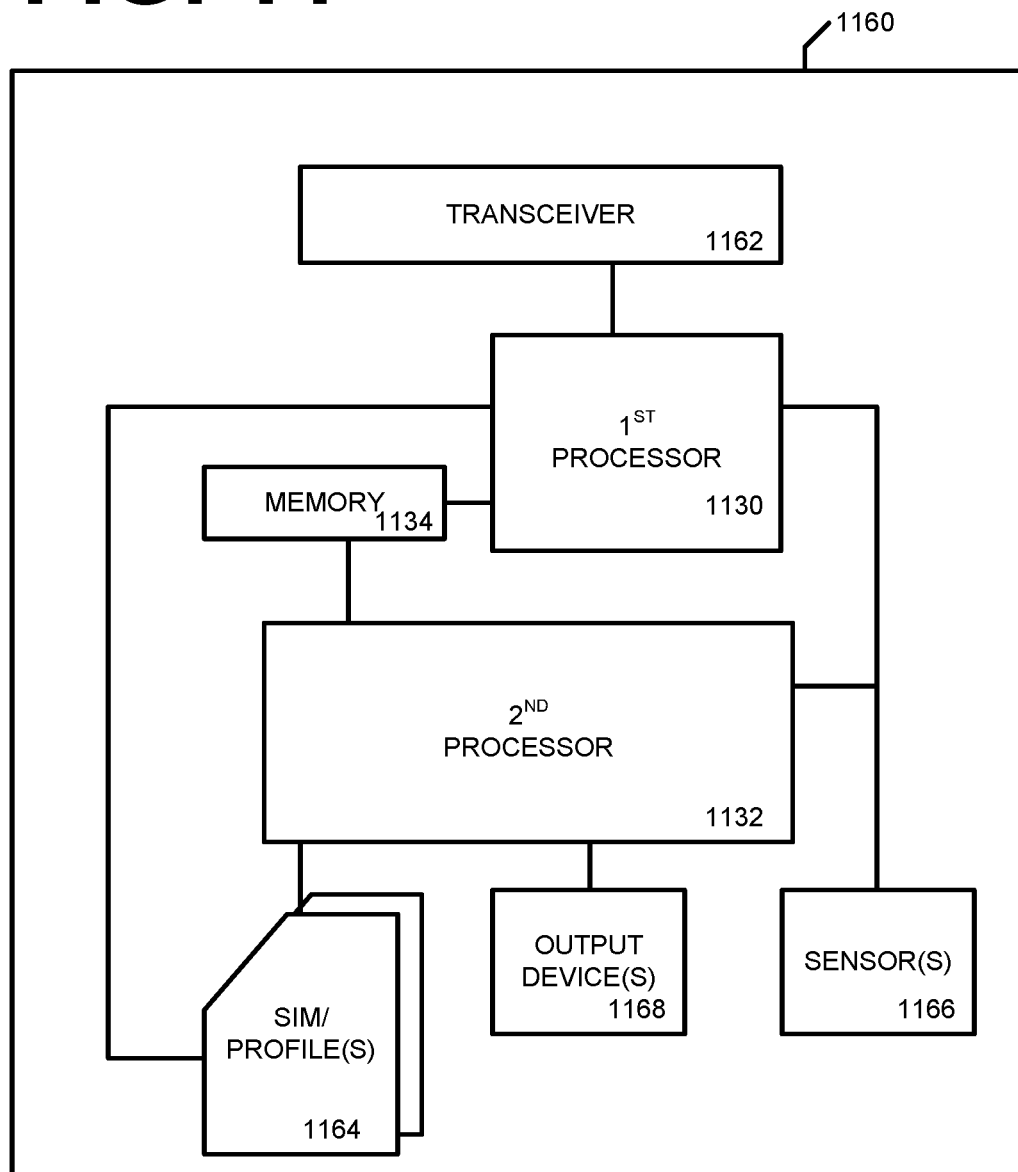
FIG. 11 illustrates a block diagram of an example wireless user equipment.

Turning now to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 34 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 30 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/ in a low power state when UE 1160 does not need it for executing applications and processing data related to an application provides an advantage of reducing power consumption when the UE only needs to use the first processor portion 1130 while in listening mode for monitoring routine configured bearer management and mobility management/ maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, that are external to UE 1160.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |

TABLE 1-continued

| Term | Definition |
|---|---|
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    transmitting, by a radio access network node comprising a processor to a first user equipment, a first bandwidth part configuration comprising a first resource arrangement corresponding to a first bandwidth part of a frequency range associated with the radio access network node and a second resource arrangement corresponding to the first bandwidth part of the frequency range allocated to the radio access network node;
    determining, by the radio access network node, a usage of the first bandwidth part being operated according to the first resource arrangement to result in a determined usage;
    analyzing the determined usage with respect to a bandwidth part change criterion to result in an analyzed determined usage;
    based on the analyzed determined usage of the first bandwidth part satisfying the bandwidth part change criterion, determining, by the radio access network node, to operate the first bandwidth part according to the second resource arrangement; and
    transmitting, by the radio access network node to the first user equipment, a bandwidth part change indication indicative of the radio access network node having determined to operate the first bandwidth part according to the second resource arrangement,
    wherein the first bandwidth part configuration comprises a third resource arrangement, corresponding to a second bandwidth part of the frequency range associated with the radio access network node, and wherein the bandwidth part change indication is indicative of the radio access network node having determined to transmit control channel traffic according to the third resource arrangement.

2. The method of claim 1, wherein operation by the radio access network node of the first bandwidth part according to the first resource arrangement uses a first subrange resource set within the frequency range associated with the radio access network node, and wherein operation of the first bandwidth part by the radio access network node according the second resource arrangement uses a second subrange resource set within the frequency range associated with the radio access network node.

3. The method of claim 2, wherein the first subrange resource set and the second subrange resource set are the same.

4. The method of claim 2, wherein the second resource arrangement comprises a deactivated resource set within the second subrange resource set.

5. The method of claim 2, wherein the second resource arrangement excludes resources from being allocated to reference signal signaling.

6. The method of claim 2, wherein the second resource arrangement excludes resources from being allocated to control channel traffic.

7. The method of claim 1, further comprising transmitting, by the radio access network node to a second user equipment, a second bandwidth part configuration comprising the third resource arrangement; and
    excluding, by the radio access network node, transmitting of the bandwidth part change indication to the second user equipment.

8. The method of claim 1, wherein the first resource arrangement and the second resource arrangement can be used to communicate with the first user equipment instead of a baseline resource arrangement corresponding to the first bandwidth part, and wherein the first bandwidth part is allocated the same resources of the frequency range associated with the radio access network node for communication with the first user equipment according to the baseline resource arrangement, the first resource arrangement, or the second resource arrangement.

9. The method of claim 1, wherein the first user equipment is one of a set of user equipment having an established connection with the radio access network node using the first bandwidth part, wherein determining the determined usage comprises determining a number of the set of user equipment having an established connection with the radio access network node using the first bandwidth part to result in a determined number of connected mode user equipment, wherein the bandwidth part change criterion comprises a connected mode user equipment threshold, and wherein the bandwidth part change criterion is satisfied by the determined number of connected mode user equipment being less than the connected mode user equipment threshold.

10. The method of claim 1, wherein the first user equipment is one of a set of user equipment having an established connection with the radio access network node, wherein determining the determined usage comprises determining a number of the set of user equipment having an established connection with the radio access network node using the first bandwidth part to obtain a quality-of-service to result in a determined number of quality-of-service user equipment, wherein the bandwidth part change criterion comprises a connected mode user equipment quality-of-service threshold, and wherein the bandwidth part change criterion is satisfied by the determined number of quality-of-service user equipment being higher than the connected mode user equipment quality-of-service threshold.

11. The method of claim 1, wherein the bandwidth part change indication is transmitted via a downlink control information signal.

12. The method of claim 1, further comprising:
determining a power supply characteristic corresponding to a power source corresponding to the radio access network node to result in a determined power supply characteristic,
wherein the bandwidth part change criterion is at least partially based on the determined power supply characteristic.

13. A non-transitory machine-readable medium, comprising executable instructions that, when executed by a processor of a radio access network node, facilitate performance of operations, comprising:
transmitting, to user equipment, a first bandwidth part configuration comprising a first resource arrangement corresponding to a first bandwidth part of a frequency range allocated to the radio access network node, a second resource arrangement corresponding to the first bandwidth part of the frequency range allocated to the radio access network node, and a third resource arrangement corresponding to a second bandwidth part of the frequency range allocated to the radio access network node;
determining a determined usage of the first bandwidth part by a first set of the user equipment;
analyzing the determined usage with respect to a bandwidth part change criterion to result in an analyzed determined usage;
based on the analyzed determined usage of the first bandwidth part satisfying the bandwidth part change criterion, determining to operate the first bandwidth part according to the second resource arrangement; and
transmitting, to the first set of the user equipment according to a scrambling code corresponding to the first set of the user equipment, a bandwidth part change indication indicative of the radio access network node having determined to operate the first bandwidth part according to the second resource arrangement,
wherein a subrange resource set within the frequency range allocated to the radio access network node is allocated for operation by the radio access network node of the first bandwidth part according to the first resource arrangement, wherein the subrange resource set within the frequency range allocated to the radio access network node is allocated for operation by the radio access network node of the first bandwidth part according to the second resource arrangement, and wherein the second resource arrangement comprises a deactivated resource set within the subrange resource set.

14. The non-transitory machine-readable medium of claim 13, wherein the determined usage comprises a determined number of the first set of the user equipment having an established connection with the radio access network node using the first bandwidth part to result in a determined number of connected mode user equipment, wherein the bandwidth part change criterion comprises a connected mode user equipment threshold, and wherein the bandwidth part change criterion is satisfied by the determined number of connected mode user equipment being less than the connected mode user equipment threshold.

15. The non-transitory machine-readable medium of claim 14, wherein the third resource arrangement is used by a second set of the user equipment different than the first set of the user equipment, and wherein the transmitting of the bandwidth part change indication excludes transmitting of the bandwidth part change indication to the second set of the user equipment.

16. A radio network node, comprising at least one processor configured to process executable instructions that, when executed by the at least one processor, facilitate performance of operations, comprising:
transmitting, to user equipment, a bandwidth part configuration comprising a first resource arrangement corresponding to a first bandwidth part of a frequency range allocated to the radio access network node, and a second resource arrangement corresponding to the first bandwidth part of the frequency range allocated to the radio access network node;
determining a determined usage of the first bandwidth part by a first set of the user equipment;
analyzing the determined usage with respect to a bandwidth part change criterion to result in an analyzed determined usage;
based on the analyzed determined usage of the first bandwidth part satisfying the bandwidth part change criterion, determining to operate the first bandwidth part according to the second resource arrangement; and
transmitting, to the first set of the user equipment, a bandwidth part change indication indicative of the radio access network node having determined to operate the first bandwidth part according to the second resource arrangement,
wherein a subrange resource set within the frequency range allocated to the radio access network node is allocated for operation by the radio access network node of the first bandwidth part according to the first resource arrangement, wherein the subrange resource set within the frequency range allocated to the radio access network node is allocated for operation by the radio access network node of the first bandwidth part according to the second resource arrangement, and wherein the second resource arrangement comprises a deactivated resource set within the subrange resource set.

17. The radio network node of claim 16, wherein the determined usage comprises a determined number of the first set of the user equipment having an established connection with the radio access network node using the first bandwidth part to result in a determined number of connected mode user equipment, wherein the bandwidth part change criterion comprises a connected mode user equipment threshold, and wherein the bandwidth part change criterion is satisfied by the determined number of connected mode user equipment being less than the connected mode user equipment threshold.

18. The radio network node of claim 17, wherein the operations further comprise:
transmitting, to the user equipment, a third resource arrangement corresponding to a second bandwidth part of the frequency range allocated to the radio access network node,
wherein the third resource arrangement is used by a second set of the user equipment different than the first set of the user equipment, and wherein the transmitting of the bandwidth part change indication excludes transmitting of the bandwidth part change indication to the second set of the user equipment.

19. The radio network node of claim 16, wherein the operations further comprise:
determining a power supply characteristic corresponding to a power source corresponding to the radio access network node to result in a determined power supply characteristic,
wherein the bandwidth part change criterion is at least partially based on the determined power supply characteristic.

20. The radio network node of claim 16, wherein the bandwidth part configuration comprises a third resource arrangement, corresponding to a second bandwidth part of the frequency range associated with the radio access network node, and wherein the bandwidth part change indication is indicative of the radio access network node having determined to transmit control channel traffic according to the third resource arrangement.

* * * * *